United States Patent [19]

Van Woensel et al.

[11] Patent Number: 4,616,382

[45] Date of Patent: Oct. 14, 1986

[54] SHRIMP-PEELING MACHINE ACCORDING TO THE METHOD

[75] Inventors: Dirk Van Woensel; Ilja Van Woensel, both of Haarlem, Netherlands

[73] Assignee: Megapel BV Mechanische Garnalenpeltechniek, Haarlem, Netherlands

[21] Appl. No.: 722,530

[22] Filed: Apr. 12, 1985

[30] Foreign Application Priority Data

Aug. 17, 1983 [NL] Netherlands ............... 8302887

[51] Int. Cl.⁴ ............................................. A22C 29/02
[52] U.S. Cl. ............................................. 17/73
[58] Field of Search ................................. 17/73, 48

[56] References Cited

U.S. PATENT DOCUMENTS 3,566,437  3/1971  Jonsson ............................... 17/73
3,576,047  4/1971  Willis ................................... 17/73

Primary Examiner—Willie G. Abercrombie
Attorney, Agent, or Firm—Majestic, Gallagher, Parsons & Siebert

[57] ABSTRACT

The invention comprises a completely automated mechanical method and process for shelling shrimp meat completely and undamaged from boiled shrimps. Toward this end, the machine is so designed and constructed that it can comprise a plurality of adjoining processing tracks without thereby leaving or exceeding the scope of the invention.

For the attainment of the automatic peeling process, the machine comprises an installation for implementing the method and process as specified, the shrimps being peeled one by one, synchronized with respect to time, transferred separately and disposed in the same direction.

Accordingly, the invention, as represented in the descriptions and drawings, aims at offering a solution to a still growing body and extent of problems around the manual peeling of shrimps from the general standpoint of public hygiene.

14 Claims, 73 Drawing Figures

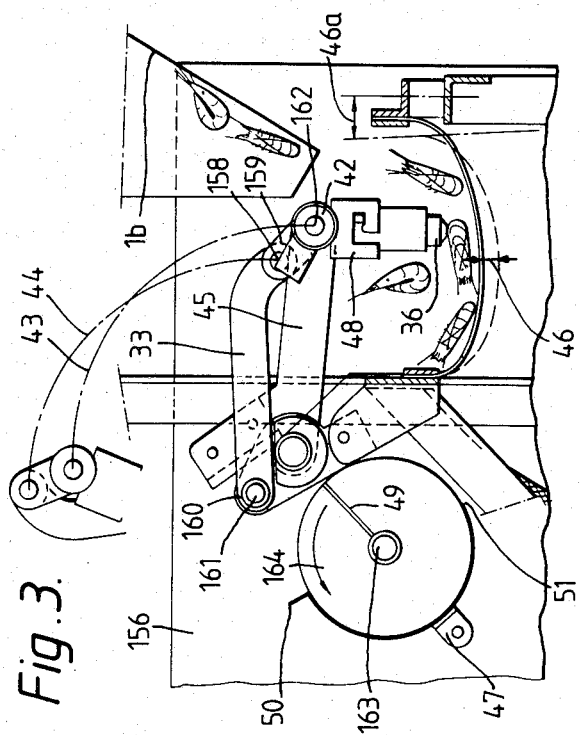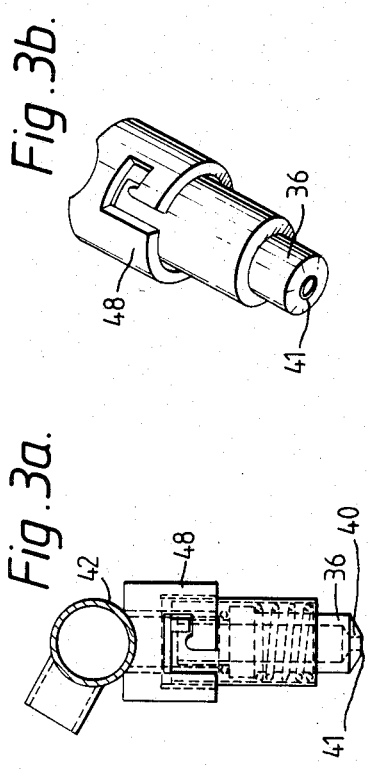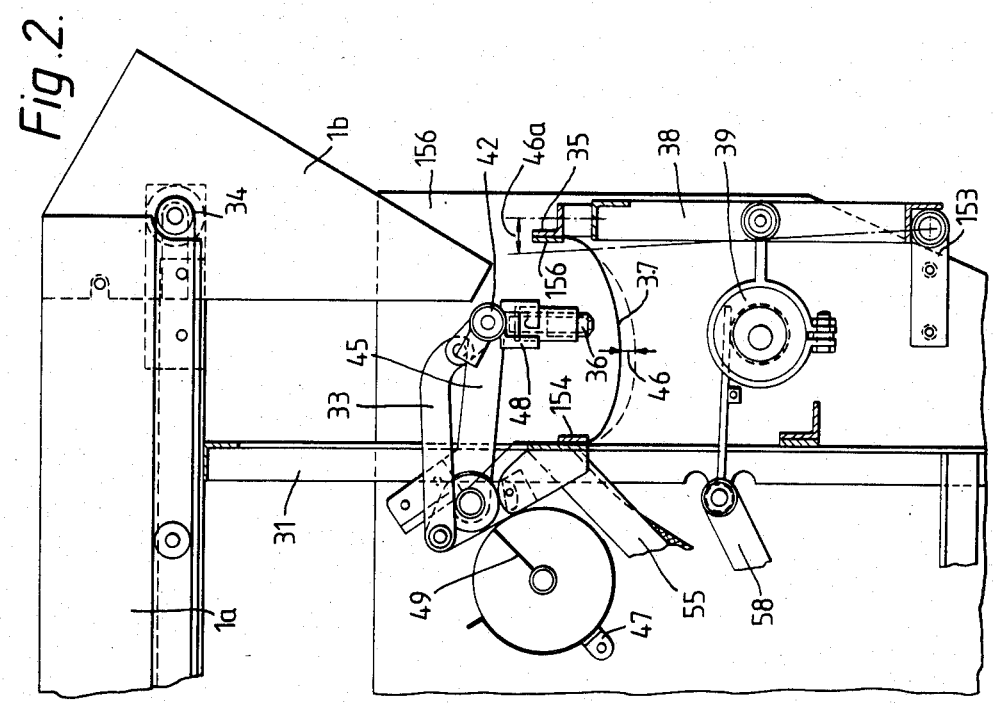

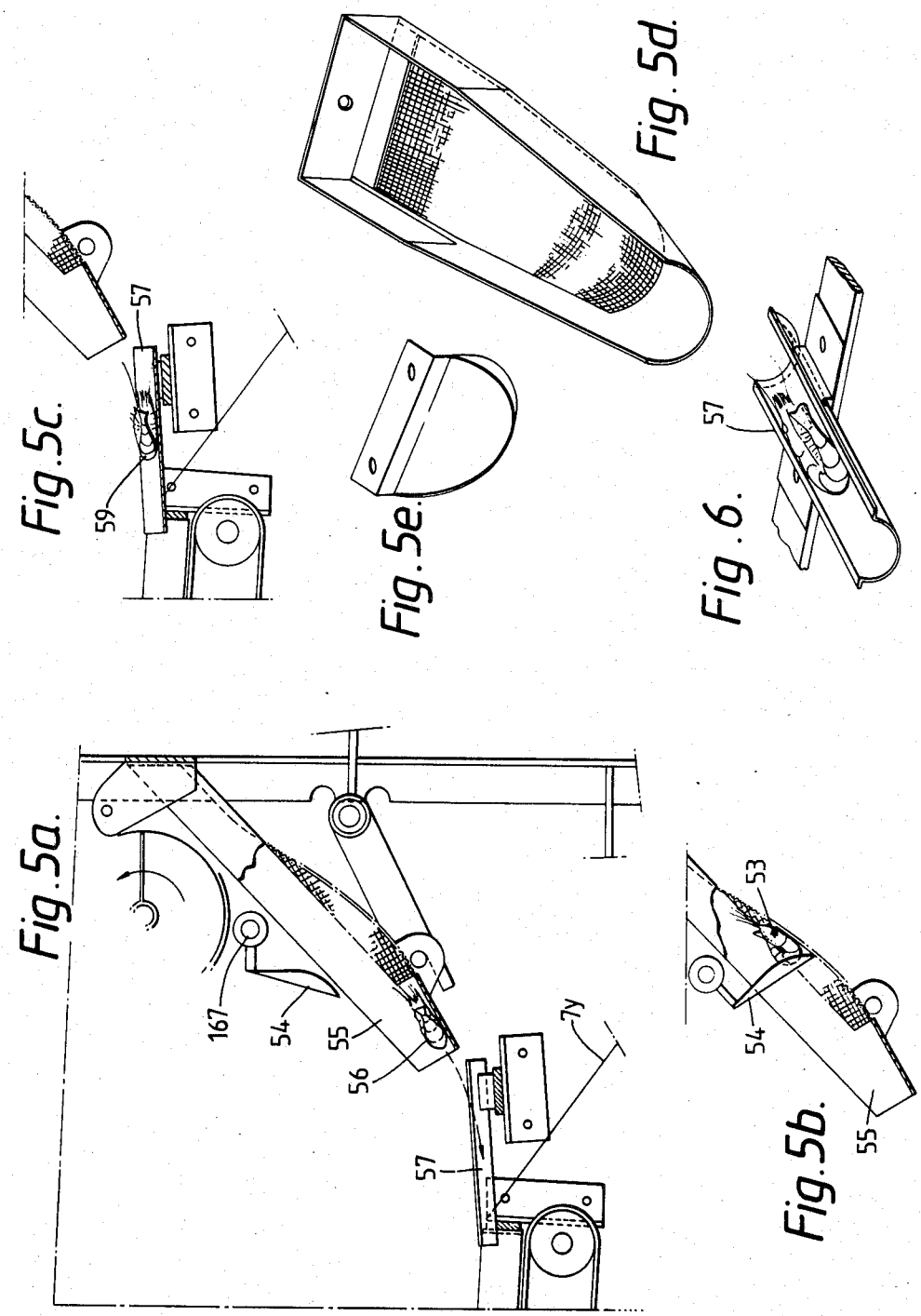

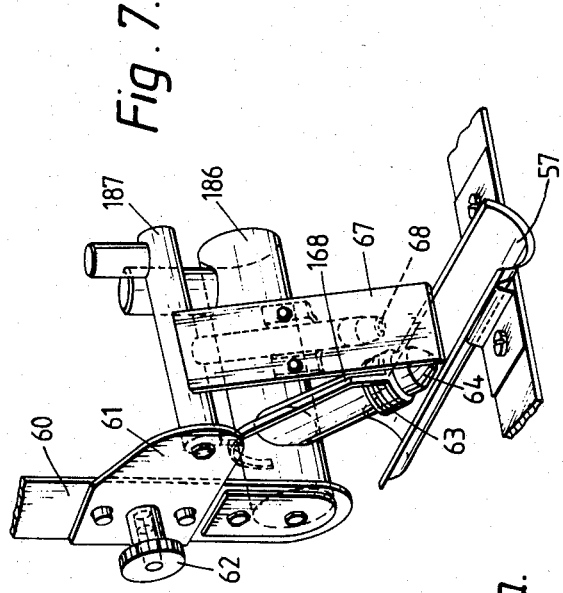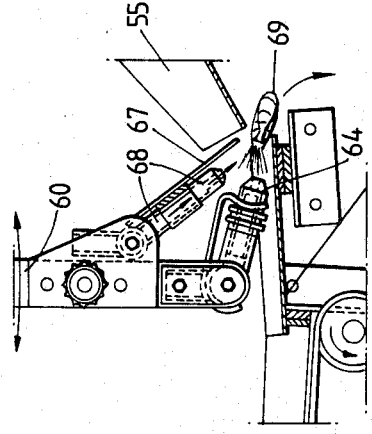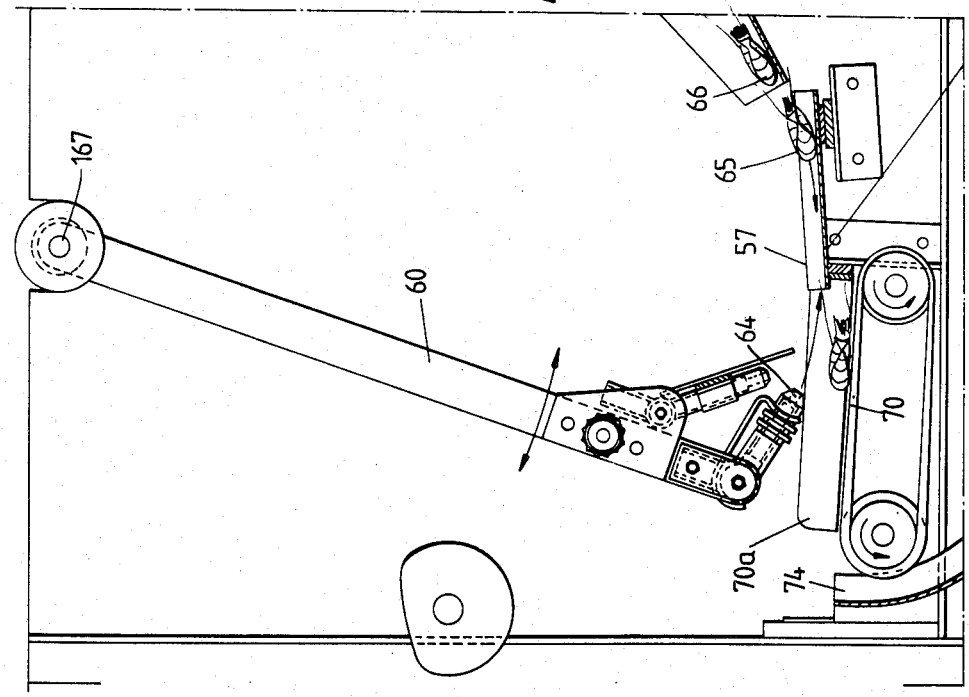

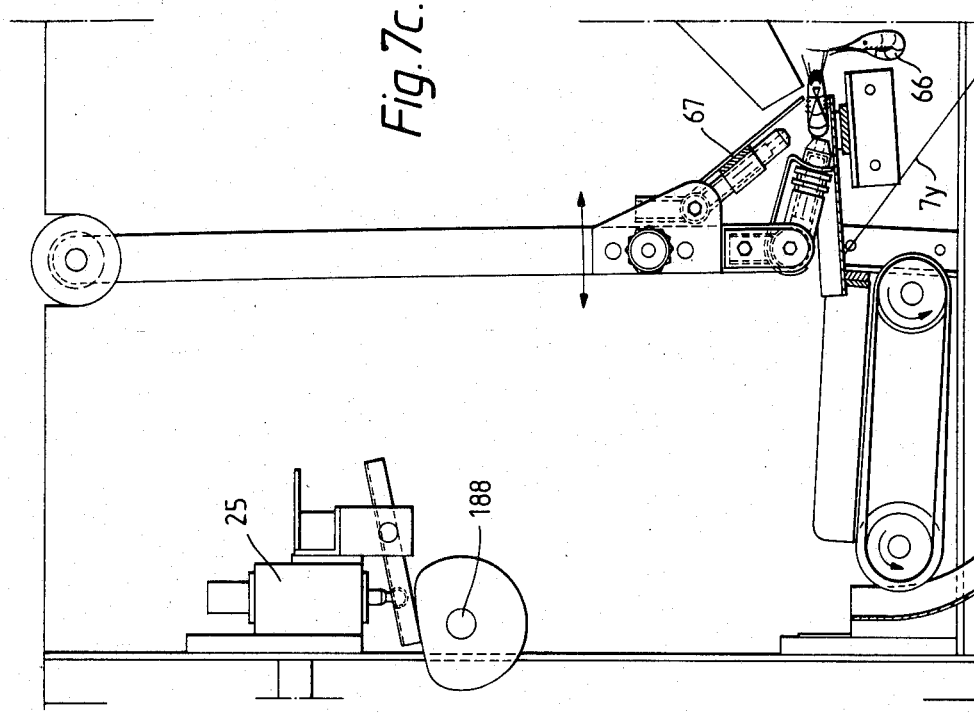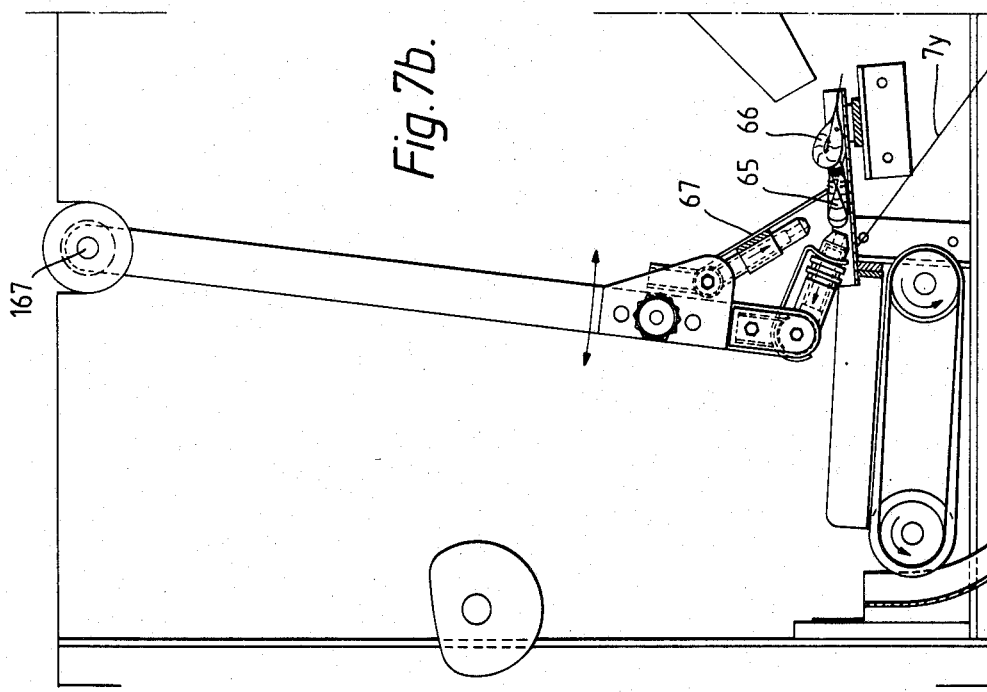

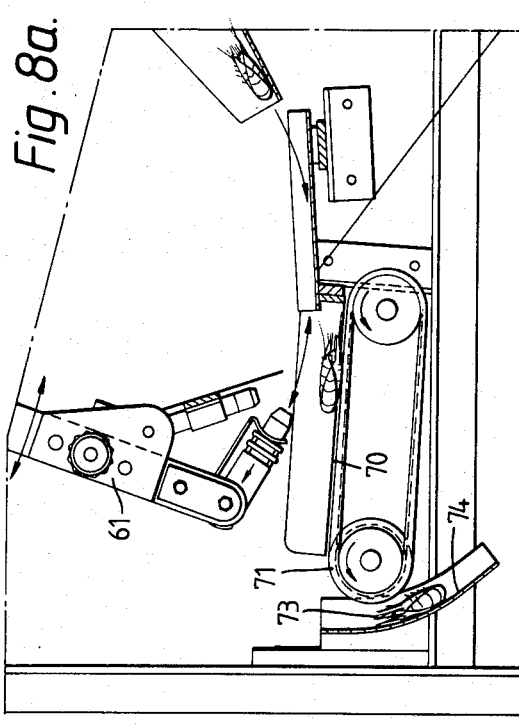
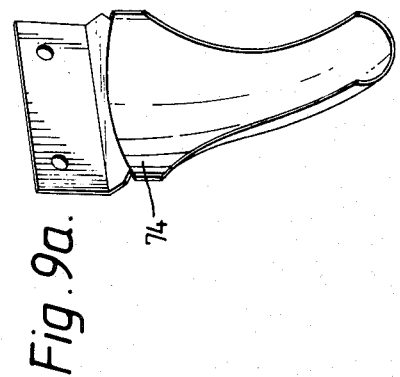
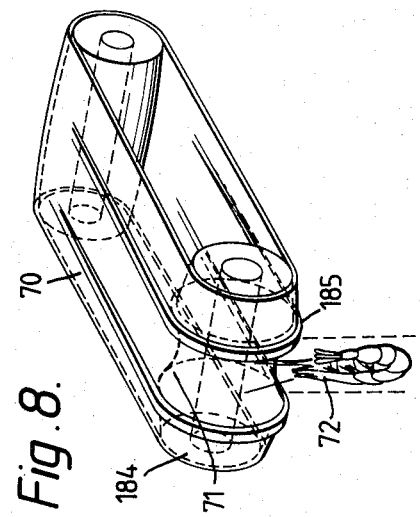
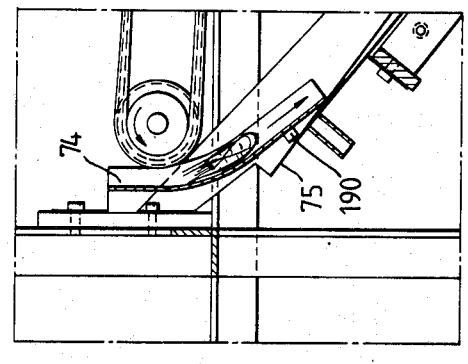

Fig. 10.
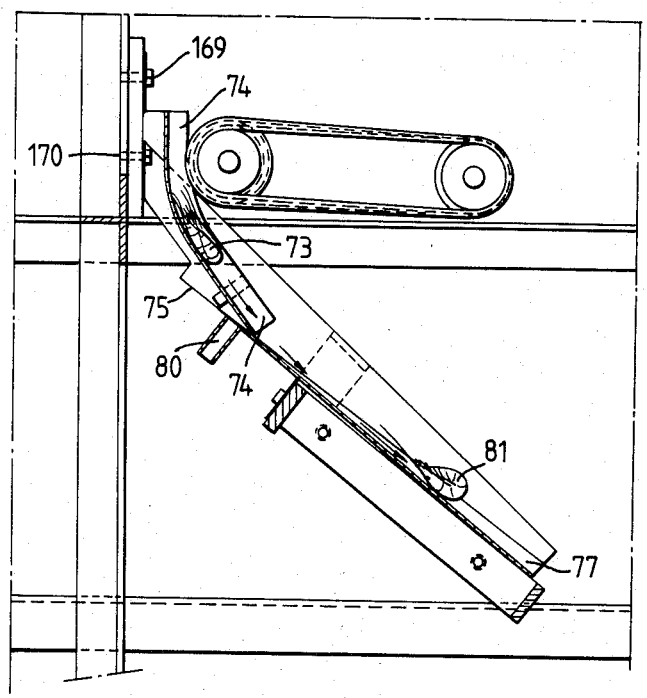
Fig. 10a.
Fig. 11.
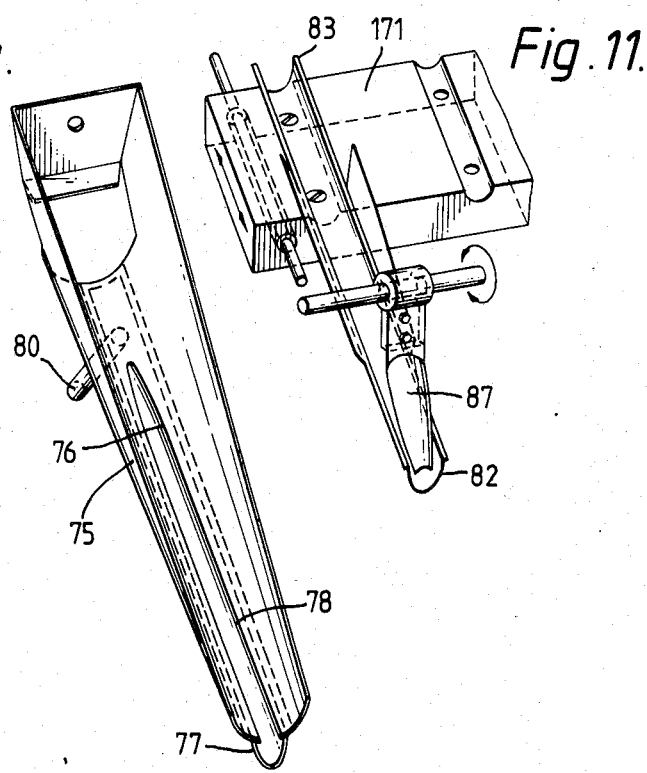

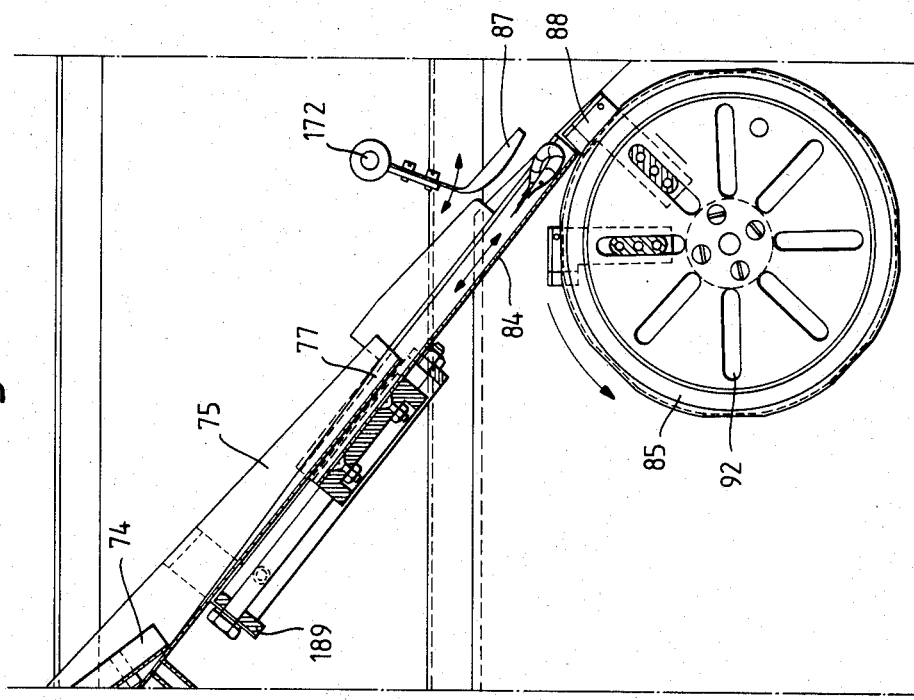
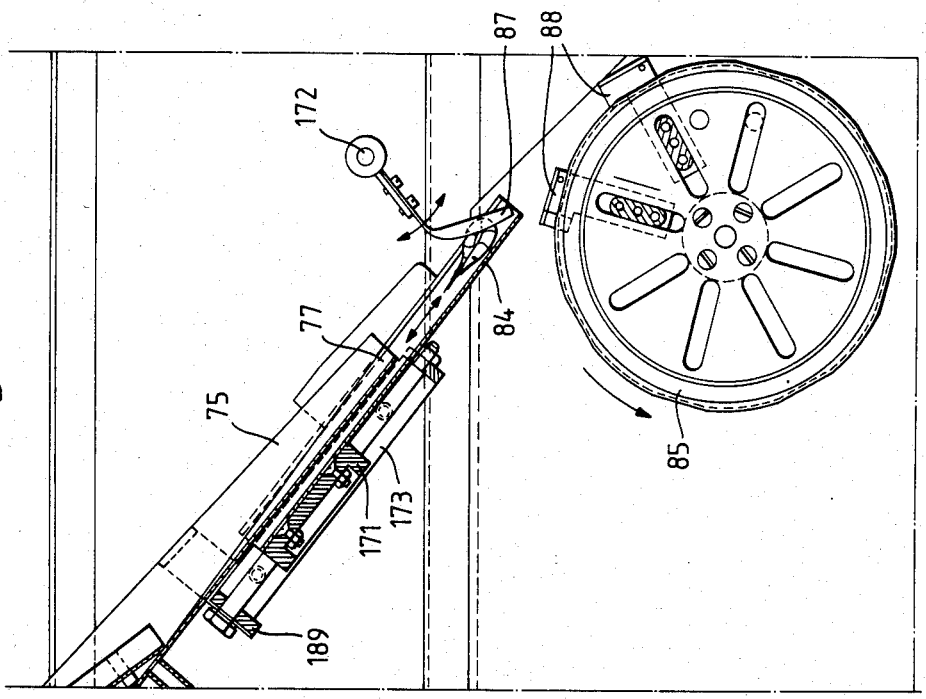

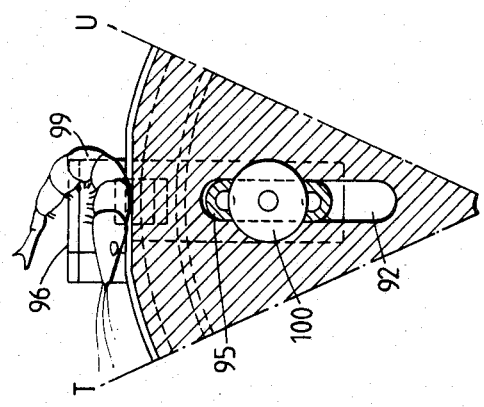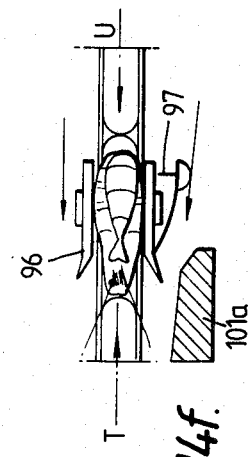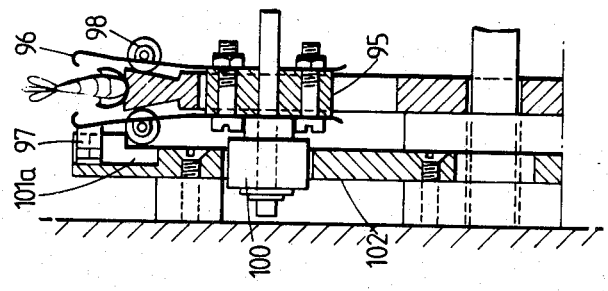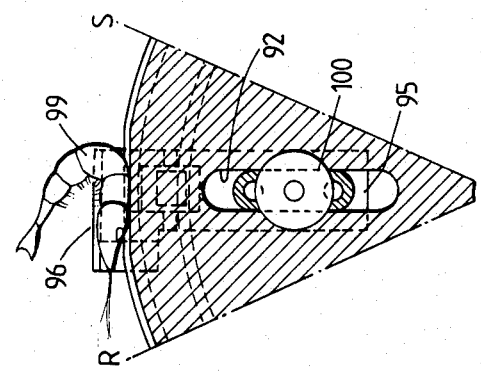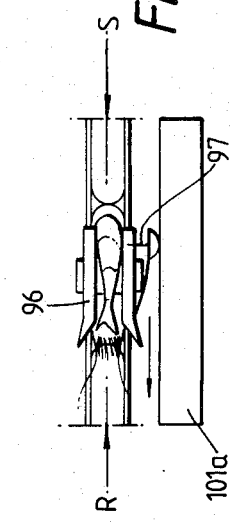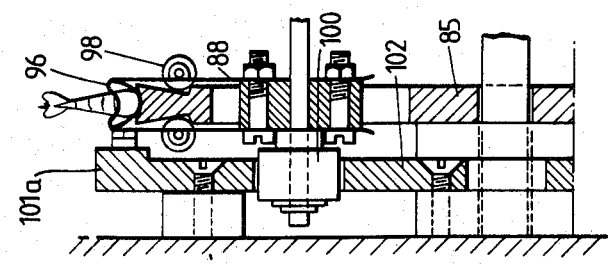

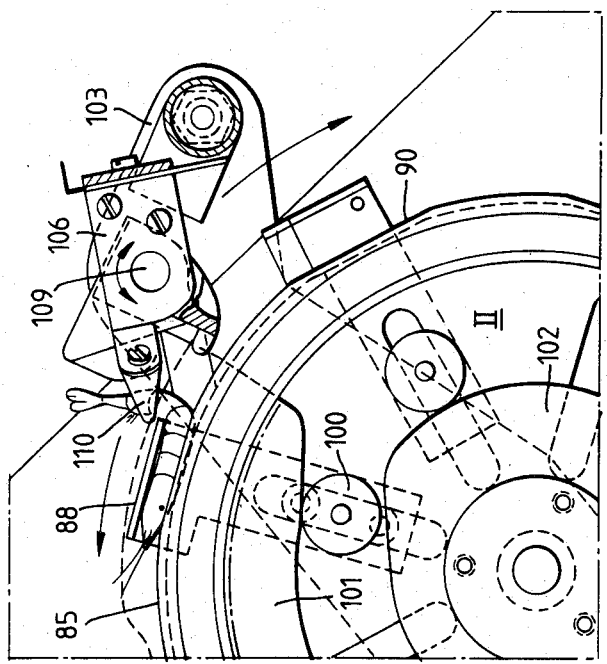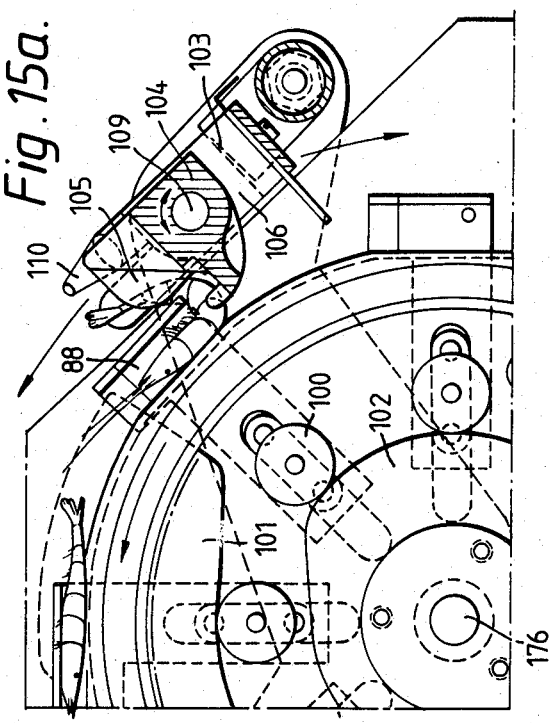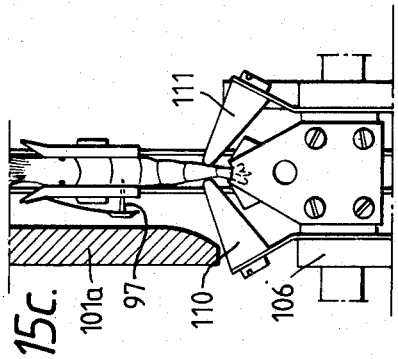

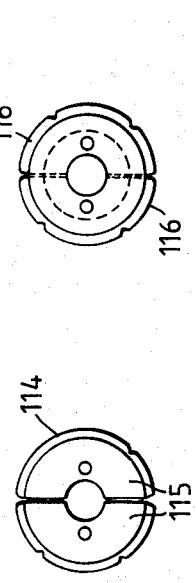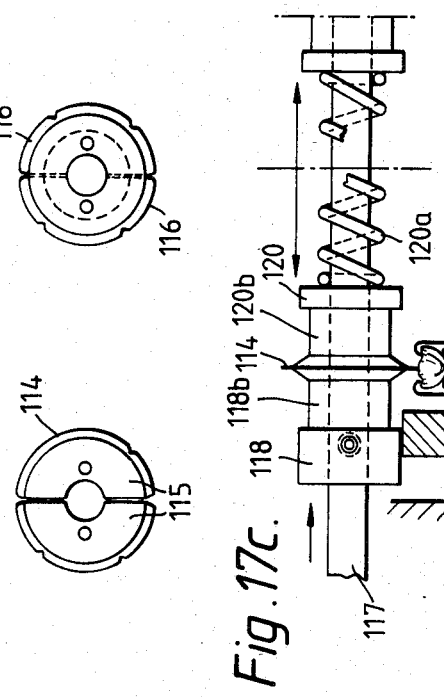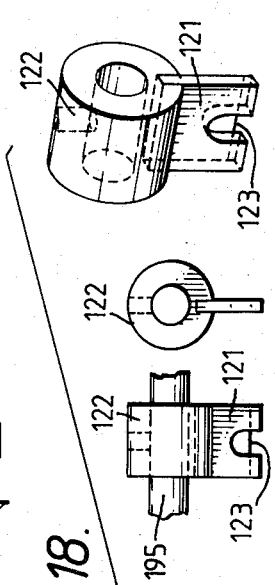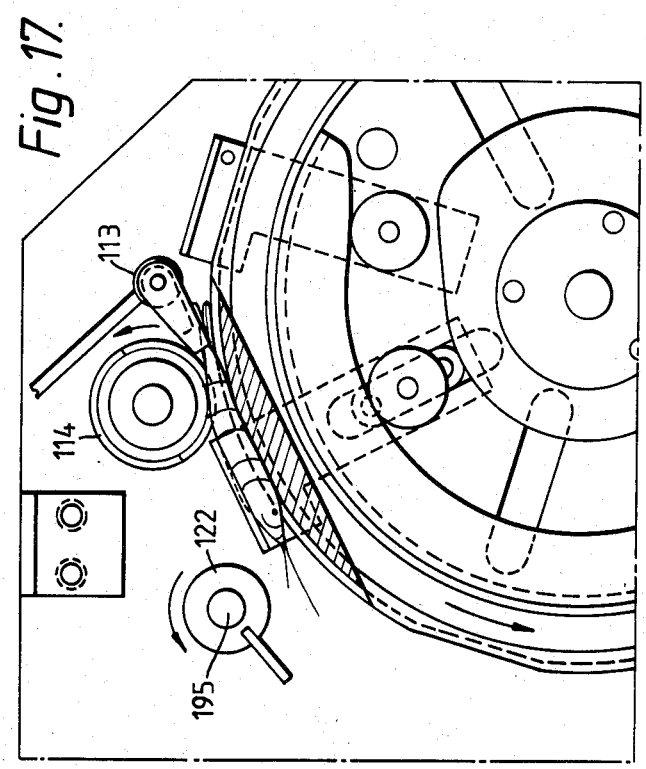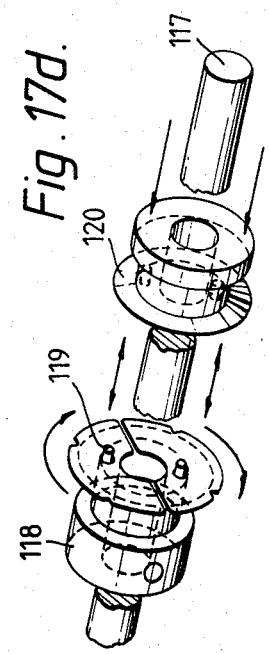

SHRIMP-PEELING MACHINE ACCORDING TO THE METHOD

AIM OF THE INVENTION

The complete shelling, without damage, of shrimp meat from boiled shrimps according to an entirely novel automated mechanical method, and machine therefor, so as to satisfy in large quantities the demand for a hygienically responsible product as well as to allow these shrimps to be processed rapidly and in the refrigerated state at times of large supplies being offered.

The invention as intended in the present patent application comprises a fully automated mechanical process for the complete shelling, without damage, of shrimp meat.

To this end, the machine is so designed that, before the shrimps are peeled, it isolates and straightens the shrimps one by one out of a quantity of shrimps being supplied to the machine for peeling.

For this purpose the machine comprises a mechanism for implementing the method for the consecutive, separate, synchronized and timely isolation, straightening, transporting and peeling of shrimps, without any need to submit the shrimps to a special boiling process, and according to which the shrimps do not have to be fully curved or coiled after the boiling process, this being attained by the assembly of the mechanical means in the embodiment of the machine and the order in which they have been or are arranged, as represented in the specifications, drawing and claims as formulated in the present patent application, which indicates separately: the method, the mechanism for implementing the method, and the machine by which the method is carried out according to the said mechanism.

Many efforts have already been made to replace the traditional manual peeling of shrimps by mechanical peeling. All efforts toward this purpose have not as yet (see filing date) produced any satisfactory result. The invention as represented in the present patent application offers a general solution for the complexness of peeling problems liable to arise in view of the random structure of shrimps supplied in different seasons of the year. The principle has been to allow even those shrimps to be peeled which are extremely difficult to peel, so that spillage is restricted.

Quick-frozen shrimps can likewise be peeled with the machine, thus allowing the market to be satisfactorily spread.

SHRIMPS GENERALLY

In many countries of the world, shrimps constitute a major source of income to coastal fisheries as well as to trade. Especially in Western Europe—mainly Germany, Denmark, the Netherlands, England, Belgium, and, to a lesser extent, France—fishing operations relate to the shrimp called Crangon. Shrimps generally occur in virtually all coastal waters throughout the world, there being a total of 120 different kinds. The color of the shrimps is usually gray, but after boiling they range from red to reddish brown. Because of their pure protein content, the meat of shrimps forms an important source of food in some countries. In Western Europe, the shrimp really constitutes primarily a delicacy, so that it is understandable that only a shrimp-peeling machine which shells the product undamaged deserves preference; however, this has not always proved possible with the prior-art peeling machines which attempt to process shrimps on a massive scale.

MECHANICAL PEELING VS. MANUAL PEELING OF SHRIMPS

Shrimps are armored little animals. In winning the shrimp meat, therefore, they must be stripped of the horny shell, which so far has had to be done by hand. The invention as expounded in the patent application aims at replacing the traditional manual peeling of shrimps by mechanical peeling, a breakthrough being attained in fully utilizing the economic applications and the further aspects. The invention furthermore aims at solving the major problem posed by the guarantee of hygiene for the peeled product as a result of the fact that the mechanically peeled shrimps no longer come into contact with possibly infected hands. This last aspect is of essential interest, since manual peeling forms a direct menace to the economic acceptance of the peeled product as well as to public health, the trade and the fishing industry. Unlike manual peeling, often taking place at unduly high ambient temperatures (called home peeling), mechanical peeling can be implemented in a suitable refrigerated space of, for example, 6 degrees centigrade above the freezing point. Especially in summer this is of the very greatest importance. The shrimps can moreover be peeled in the fresh state from day to day. For this purpose, the cooling chain between ship and peeling mill does not require to be interrupted.

THE PEELING MACHINE

The peeling machine occupies a central position in a series of preliminary operations to which the raw shrimps supplied, called dull peeling-mill shrimps, are submitted before they can be introduced into the peeling machine. One of these consists in removing components which are extraneous to the shrimps. The shrimps must furthermore be graded by size (peripheral equipment has already been developed). The shrimp-peeling machine as described in the patent application is of the synchronized type, meaning that each size of shrimps is submitted to its proper operation in the machine suitable for this purpose at exactly the right time. The machine arranges that this takes place in a succession of operations. An extremely trustworthy and safe synchronizing system in the machine ensures this faultless operation, so that no failures can take place in the time intervals prevailing along the chain of shrimps. One by one, the shrimps are isolated exactly on time in the machine, and guided along four or six tracks of width per peeling machine, or a multiple thereof (called peeling units). In doing so, the machine performs 60 operating strokes a minute, so that, on the basis of an average of 720 shrimps per kg, an average of 4 to 5 kg of unpeeled shrimps can be processed per peeling unit per hour. The peeling machine can achieve this in a plurality of operations by means of peeling tracks that are arranged side by side, and in doing so can operate continuously. The net outputs of the peeling machine as compared to manual peeling are about equal, and range from 32 to 36 percent of shrimp meat.

VALUE OF THE PEELING MACHINE IS SUPERSEDING MANUAL SHRIMP PEELING

Many factors are already present which make mechanical shrimp peeling preferable to manual peeling. A regularly guaranteed peeling capacity will bring about stability in the supply and in the trade. A fresh product, where possible without added preservatives, will be eagerly demanded and find its way to the consumer. The fact that the cooling chain is not interrupted will cause the content of bacteria to drop to a minimum number of germs, so that annoyance and danger to the fishing industry, to the trade and to public health are obviated. This is true internationally on account of the coming regulation concerning peeled shrimps having an upper limit of permissible bacterial content. It is repeatedly being found by Food Act inspectors that manually peeled shrimps are rather regularly infected with pathogenic germs, which constitutes a definite danger to public health; it has therefore been decided, according to information received (Department of Health), that no more permits are to be issued for manual shrimp peeling insofar as this is contracted out from house to house (Netherlands, 1982). Similar measures are to be expected in Germany; in Denmark they have already entered into force. The number of germs constituted by true pathogenic bacteria observed with the use of the method and machine specified in the present patent application is substantially lower than is the case with manual peeling, which is practised virtually everywhere. Mechanical peeling is capable of complete control; manual peeling is not. The product offered by the peeling machine as here referred to is flawlessly beautiful, without any impairment of the shrimp meat, which can definitely not be said for the other, prior-art peeling machines.

Accordingly, the aim of the invention as represented in the present patent application consists at the same time in offering a solution to the still increasing body of problems around the peeling of shrimps as induced by what is called manual peeling.

INTRODUCTORY STATEMENT BELONGING TO THE SPECIFICATION OF THE OPERATION OF THE SHRIMP-PEELING MACHINE, AS WELL AS TO THE DRAWINGS

All forms of embodiment of the shrimp-peeling machine specified in the present application are in principle similar to each other. The variations allowing the different sizes of shrimps to be peeled relate to the mutual dimensions of the components in the machine, which is indicated neither in the drawings nor in the descriptions. The forms of embodiment therefore remain in principle equal for each size of shrimp-peeling machine without leaving the scope of the invention. The peeling machines are built up broadwise from a plurality of what is called peeling units; for the sake of clarity, the principle of operation of one peeling unit is discussed. Direct drawings and specifications are presented exclusively for the preferred embodiments of the methods, since these relate to a machine which has been tested in practice by the inventors and builders.

The numbered items 1a through 32 in

FIG. 1 are separately explained and clarified on the basis of sketches and drawings, the drawings being marked with:

FIGS. 2, 2a, 2b, etc., relating to item 2, FIG. 1;

FIGS. 3, 3a, 3b, etc., relating to item 3, FIG. 1; etc.

For the order and sequence of the processing elements in the peeling machine and the explanation of reference marks in FIG. 1, see sheet 6.

Note for the explanation of the reference marks for the various items in the drawings that are numbered by component:

In FIGS. 2, 2a, 2b, etc., FIGS. 3, 3a, 3b, etc., to give an example, the various items in these drawings are numbered consecutively; identical and corresponding items in the various drawings bear the same numbers with a prefixed indication in the specification showing to which drawing or figure they belong. Example: FIG. 11.87 relates to the same part as that shown in FIG. 12b.87.

The shrimp-peeling machine is composed of a number of essentially functional components which jointly constitute the whole of the machine. The order for the parts as accommodated in the peeling machine is so selected as to constitute the only possible manner, as shown in FIG. 1, where:

Item 1a is a conveyor belt
Item 2 is a vibrating receptacle
Item 3 is an aspirator
Item 4 is a time divider
Item 5 is a vibratory trough
Item 6 is a separating trough
Item 7 is a separating mechanism
Item 8 is a small belt conveyor
Item 9 is a reversing trough
Item 10 is a collecting and directional trough
Item 11 is a transfer trough with water
Item 12 is a regulating valve
Item 13 is a peeling disc
Item 14 is a peeling clamp
Item 15 is a collecting and pushing mechanism
Item 15b is a tail-stretching mechanism
Item 16 is a tail-straightening mechanism
Item 17 is a rotating knife
Item 18 is a rotating rubber flap
Item 19 is a tall-removing mechanism
Item 19b is a tail-ejecting brush
Item 20 is a ring stripper
Item 21 is an opening mechanism for shrimp meat
Item 22 is a meat-removing mechanism
Item 23 is a screening sheet
Item 24 is a rotating shell brush
Item 25 is an air-valve mechanism
Item 26 is an air circuit, a–k
Item 27 is a water circuit, a–e
Item 28 is a receptacle for tails
Item 29 is a receptacle for shrimp meat
Item 30 is a receptacle for shells
Item 31 is a frame
Item 32 is an electric motor.

The numbered figures specified hereinafter may be provided with explanations, as follows:

FIG. 1 is a diagrammatic representation of the overall peeling machine and of the accommodation of the components arranged in the proper order in a frame.

FIG. 2 is a diagram of a vibrating receptacle, FIG. 2.35; visible is part of the conveyor belt 2.34 arranged above the diagram of the vibrating receptacle, in which can be seen the suction mouths 2.36 in the vibrating receptacle, in the lower position, with flexible bottom 2.37; also visible is the frontally mounted eccentric mechanism 2.38–2.39.

FIG. 3 is a diagram of the aspirator, with at left the time divider 3.47 and at right a part of the vibratory trough with the suction bracket 3.45 toward the right, and the suction mounths 3.36 in the vibratory trough.

FIG. 3a is a diagram of the suction mouth 3a.36 and the attachment to the suction tube with the bayonet joint, FIGS. 3a.48 and 3.48.

FIGS. 3b shows the exchangeable suction mouth with the bayonet joint.

Figure 5:
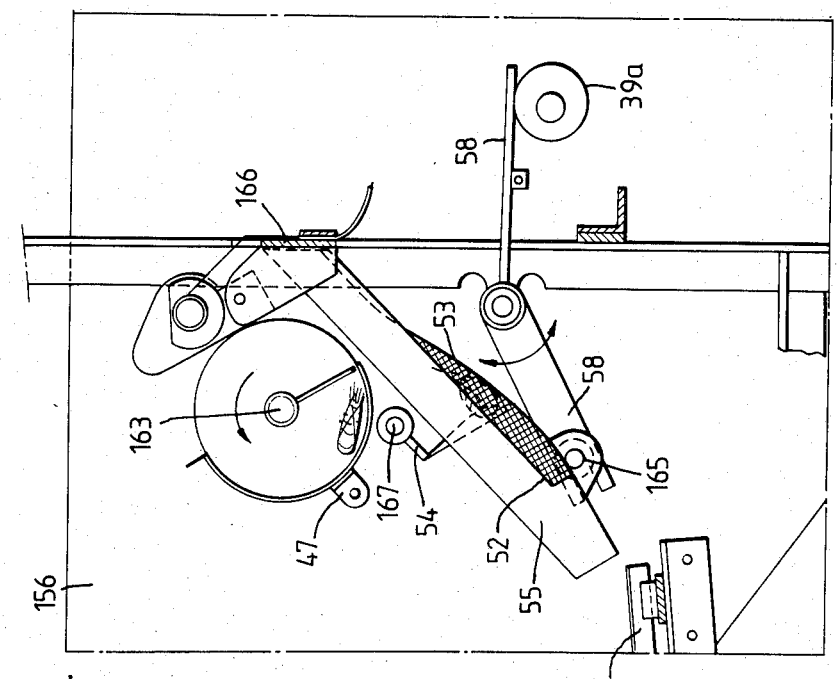

FIG. 5 is a diagram of the vibratory trough 5.55 with closed valve 5.54 and arranged above it the time divider 5.47.

FIG. 5a shows the same vibratory trough with opened valve 5a.54.

FIG. 5b shows this vibratory trough with closed valve 5b.54.

FIG. 5c shows the shrimp arriving from the vibratory trough in the separating trough 5c57.

FIG. 5d shows the design of the vibratory trough in perspective with wire fabric bottom.

FIG. 5e shows the form of the valve 5a.54, 5b.54.

FIG. 6 is a perspective view of the separating trough.

FIG. 7 is a perspective view of the separating mechanism.

FIG. 7a is a diagram constituting a front view of the separating mechanism, where the shrimps slide into the separating trough 7a.57.

FIG. 7b is an elevational view of the separating mechanism with two shrimps at the same time in the separating trough, 7b.65, 7b.66.

FIG. 7c is a view of a second, properly positioned shrimp being pushed away, 7c.66.

FIG. 7d is a view of a shrimp 7d.69 in reversed position, which is being blown away.

FIG. 8 is a perspective view of a small conveyor belt with special end pulley 8.71.

FIG. 8a is a diagram of a small conveyor belt connecting to the reversing trough 8a.74.

FIG. 9 is a diagram of the reversing trough 9.74 with shrimp.

FIG. 9a is a perspective view of the form of the reversing trough.

FIG. 10 shows the directional trough 10.75 with the connection of the reversing trough 10.74.

FIG. 10a is a perspective view of the form of the directional trough.

FIG. 11 is a perspective view of the reciprocating transfer trough.

FG. 11a shows the transfer trough 11a.84 in its upper position.

FIG. 11b shows the transfer trough 11b.84 in its lower position, connecting to the peeling disc 11b.85.

Figure 12A:
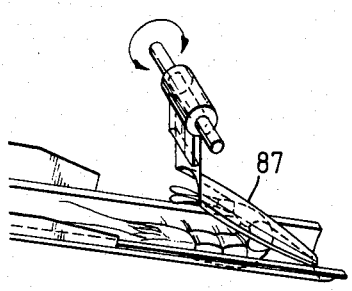

FIG. 12a is a perspective view of the regulating valve 12a.87 in the closed position, thus retaining a shrimp.

Figure 12B:
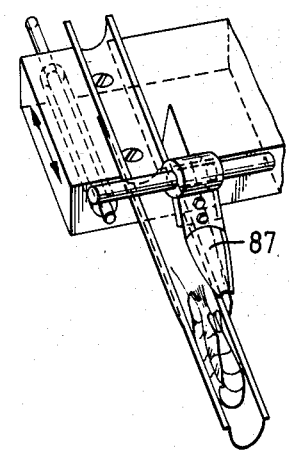

FIG. 12b is a perspective view of the transfer trough with the regulating valve 12b.87 in the open position, in which a shrimp is being passed.

Figure 13A:
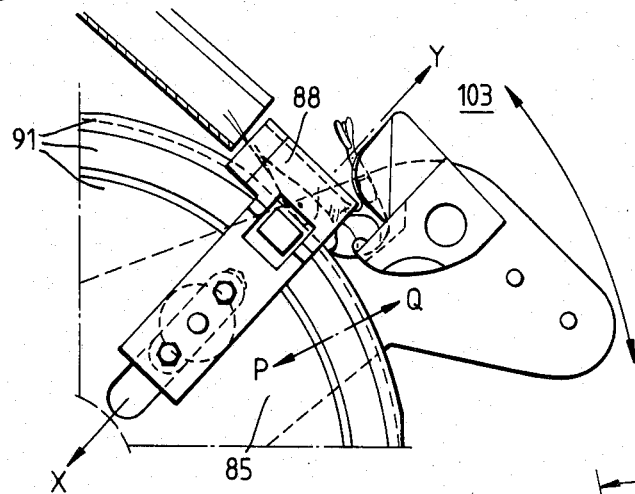
Figure 13B:
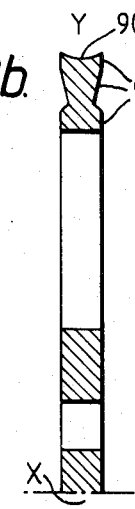
Figure 13C:
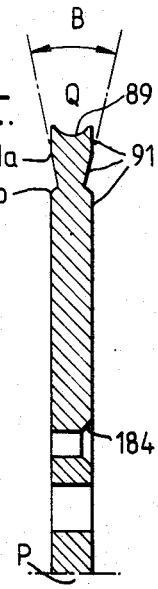
Figure 14:
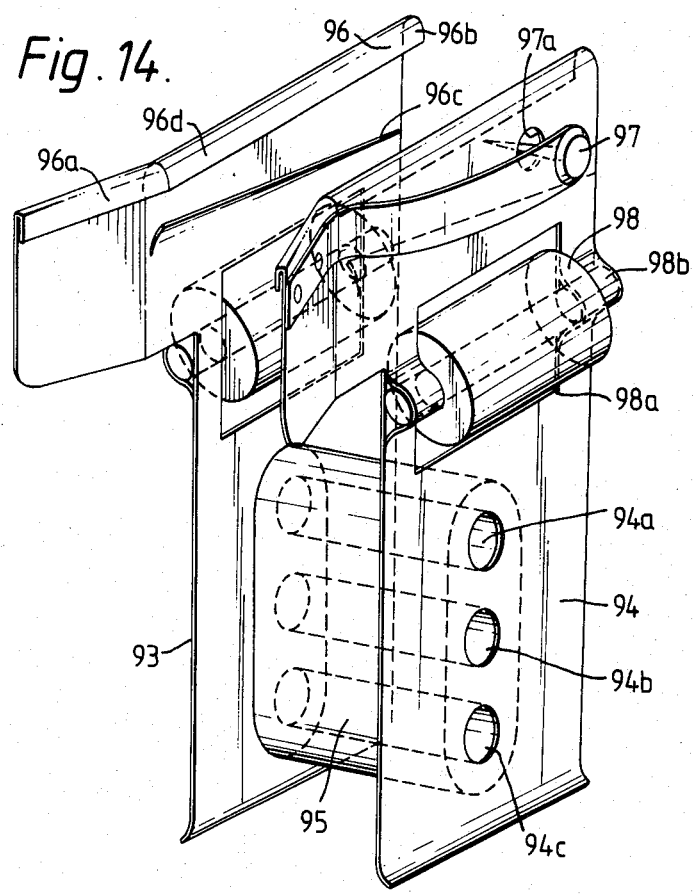
Figure 14G:
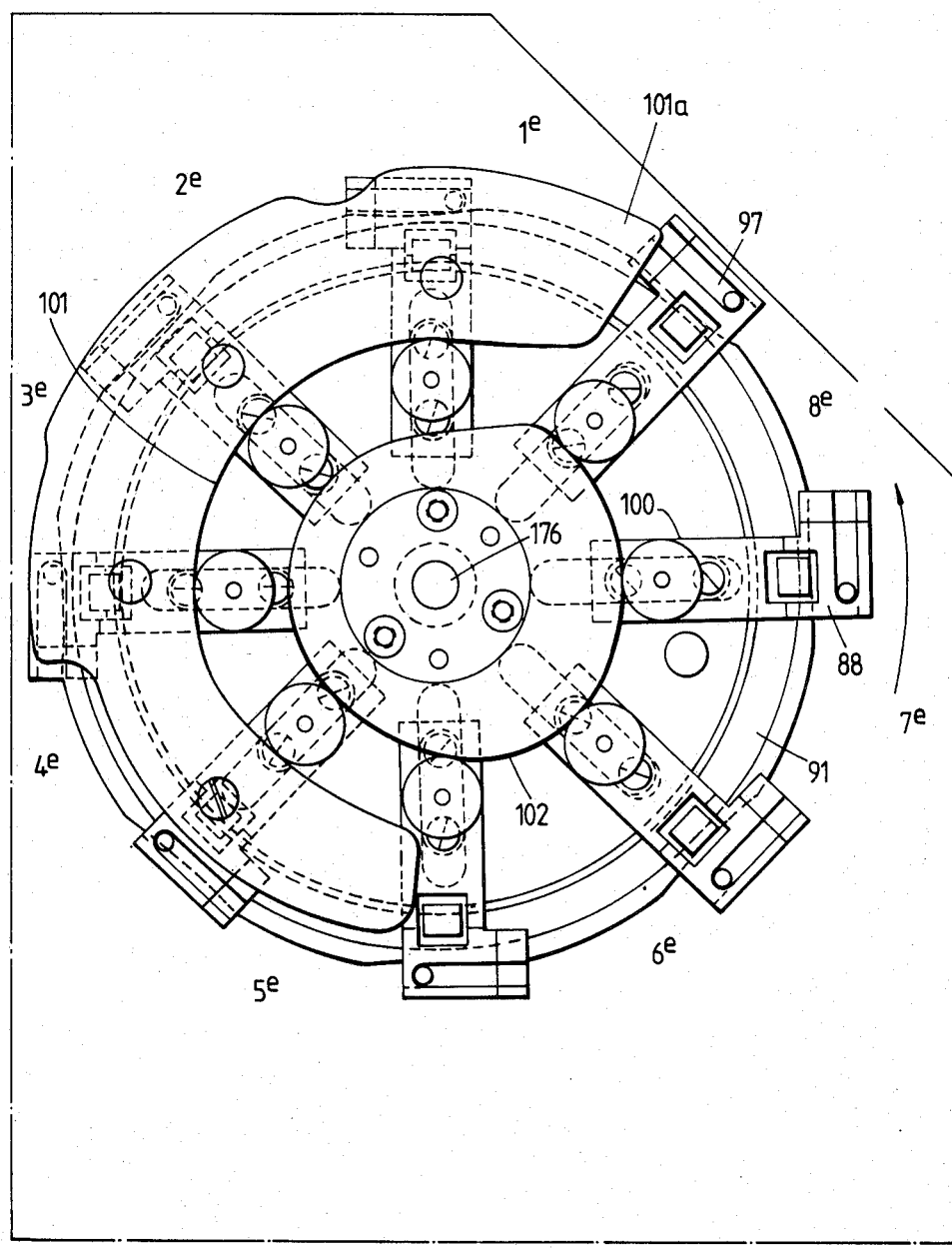

FIG. 13: see FIG. 14g.

FIG. 13a is a partial view of the peeling disc 13a.85 with one peeling clamp 13a.88 in the open position.

FIG. 13b is a sectional view of the peeling disc along X-Y at the peeling clamp; see FIG. 13a.

FIG. 13c is a sectional view of the peeling disc along P-Q behind the peeling clamp; see FIG. 13a.

FIG. 14 is a perspective view of a peeling clamp.

FIG. 14a shows the fastening of the peeling clamp 14a.88 in the peeling disc 14a.85 by means of the slide blocks 14b.95, with the shrimp 14b.99 being gripped.

FIG. 14b is a front view of FIG. 14a, section along R-S (FIG. 14c).

FIG. 14c is a top view of FIG. 14b with a shrimp in the peeling clamp 14c.96 (hooking upper grip).

FIG. 14d shows a peeling disc with opened peeling clamp.

FIG. 14e is a front view of FIG. 14d, section along T-U (FIG. 14f).

FIG. 14f is a top view of FIG. 14e.

FIG. 14g is a diagram of a peeling disc with peeling clamps 14g.88 with guide rollers 14g.100 and guide tracks for directing the peeling clamps, FIGS. 14g.102, 14g.101a; see FIGS. 14d, 14f.101a and 14g.101.

Figure 15:
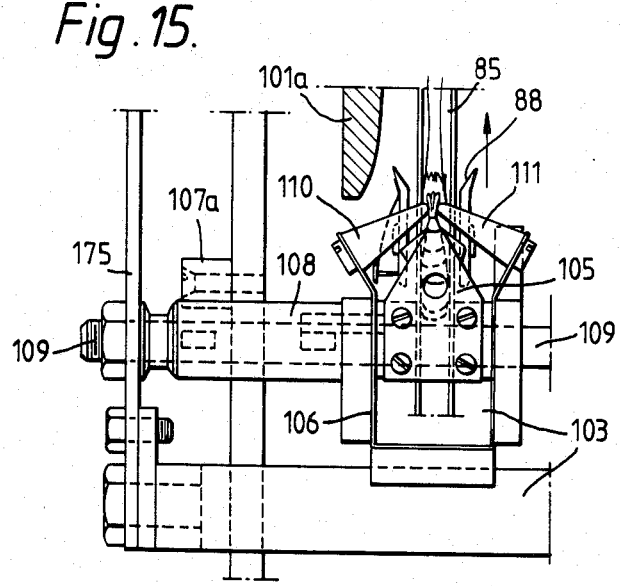

FIG 15 is a top view of the collecting and pushing mechanism with peeling disc 15.85 and peeling clamp 15.88 in the filling position.

FIG. 15a is a diagram of the pushing mechanism in the pushing position, with shrimp.

FIG. 15b shows the situation of stretching the tail of the shrimp by means of the tail stretcher 15b.106.

FIG. 15c shows the situation of complete stretching of the shrimp tail in top view.

Figure 15D:
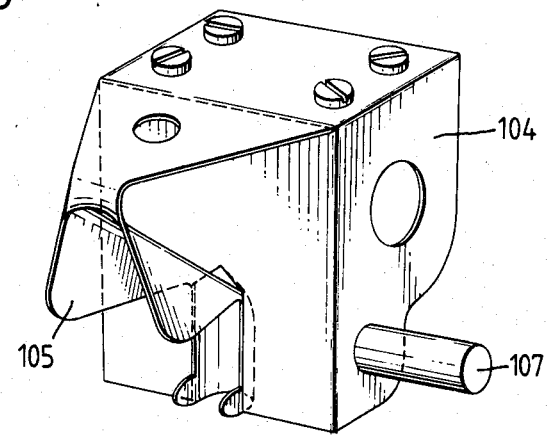

FIG. 15d is a perspective view of a collecting cap for the shrimp, see 15d.105, attached to the pushing block 15d.104.

Figure 16:
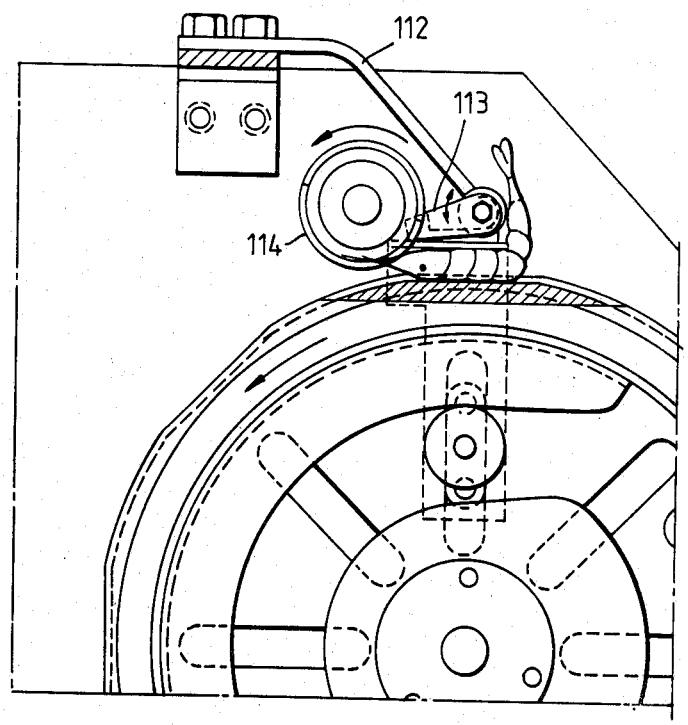

FIG. 16 is a diagram of the tail-straightening mechanism 16.112.

Figure 16A:
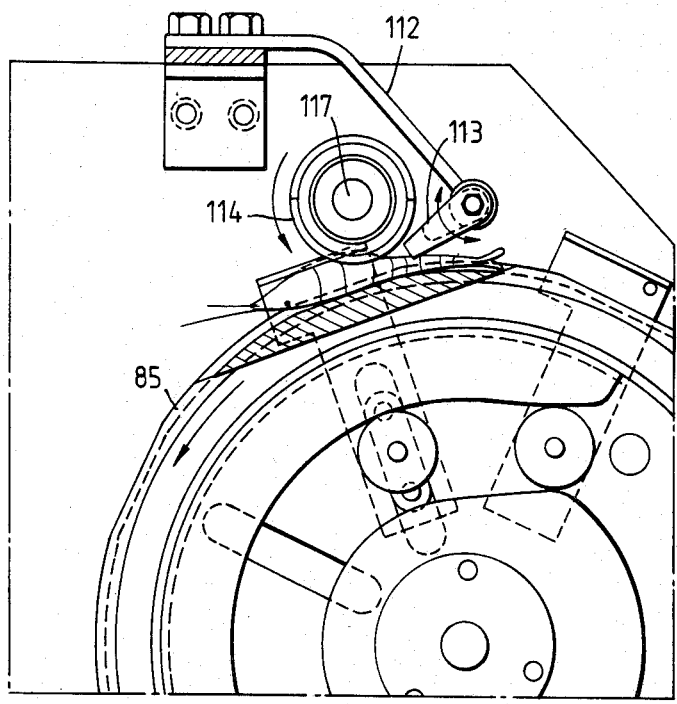

FIG. 16a shows the situation while the shrimp tail is being held in the straightened position, 16a.113.

Figure 16B:
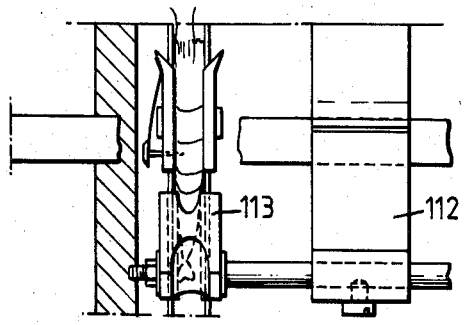

FIG. 16b is a top view of the tail of the shrimp passing underneath the block 16b.113.

Figure 16C:
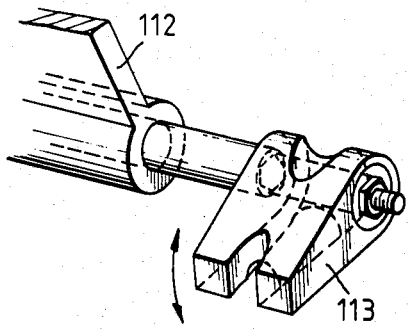

FIG. 16c is a perspective view of the straightening mechanism 16c.112.

FIG. 17 is a diagram of the rotating knife 17.114 during the incision of the shrimp.

FIG. 17a shows the form of the knife segments 17a.115.

FIG. 17b shows the somewhat sword-shaped periphery 17b.116 of the knife segments, resulting from the placement in the holder 17d.

FIG. 17c shows the composite design of the knife segments in the holder.

FIG. 17d is a perspective view of the holder with the knife segments.

FIG. 18 comprises a diagram and a perspective view of the design of the rotating rubber flap.

Figure 18A:
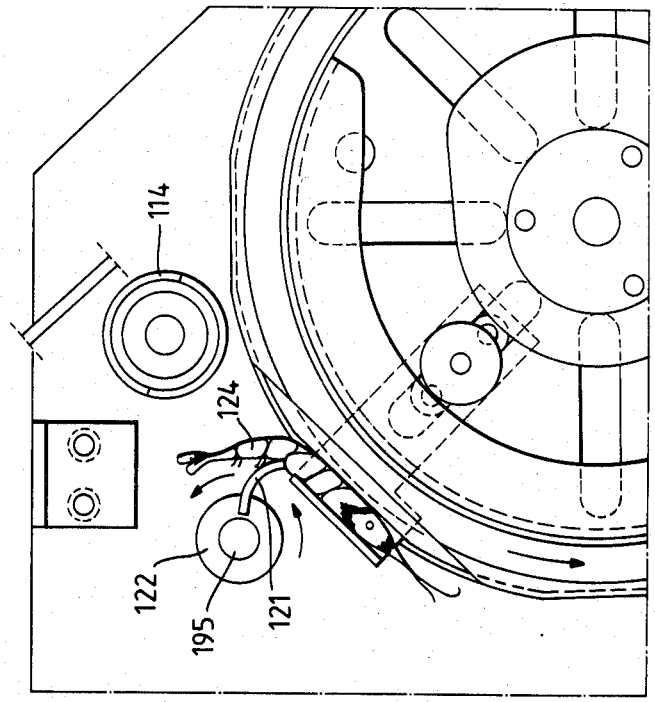

FIG. 18a shows the operation of the rubber flap 18a.121.

Figure 19:
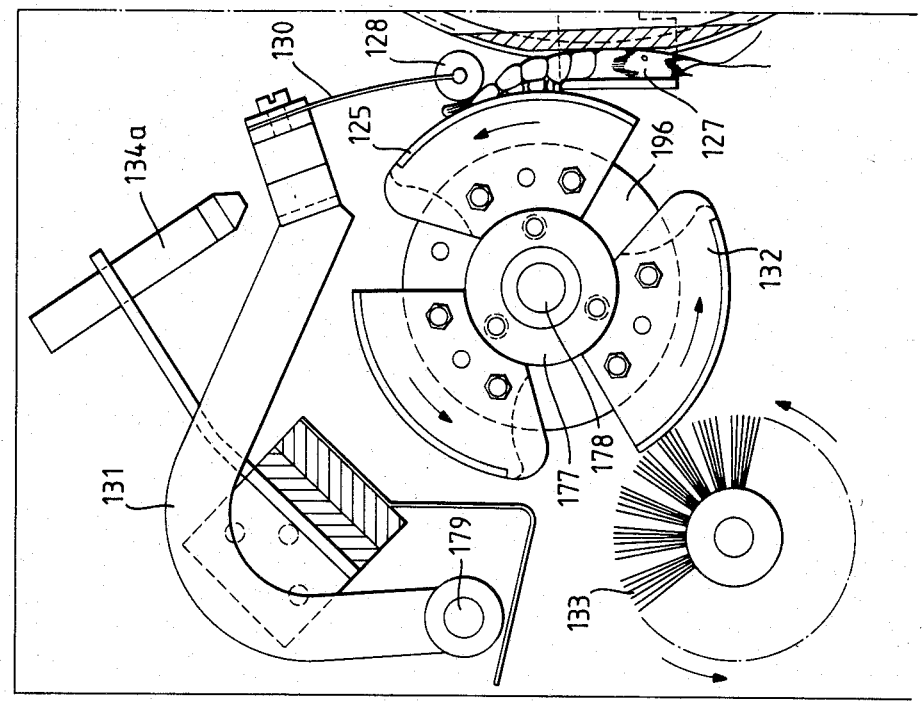

FIG. 19 is an overall drawing of the tail-removing mechanism, the tail of the shrimp 19.127 being retained by the roller 19.128.

Figure 19B:
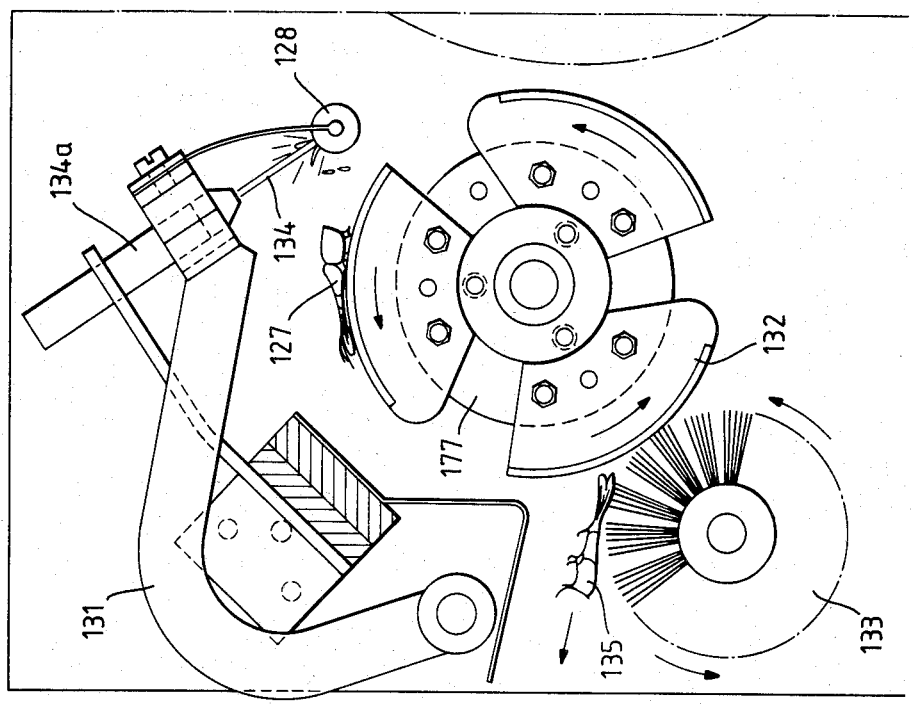
Figure 19A:
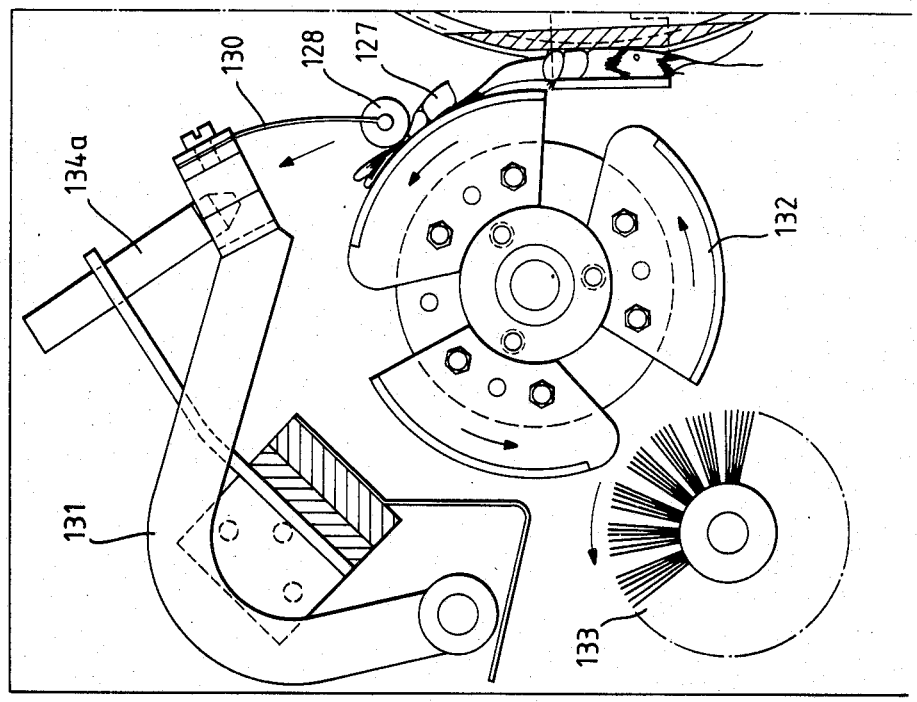

FIG. 19a shows the situation of the tail being removed, 19a.127, 19a.128.

FIG. 19b shows the situation of the tail having been severed and being brushed away.

Figure 19C:
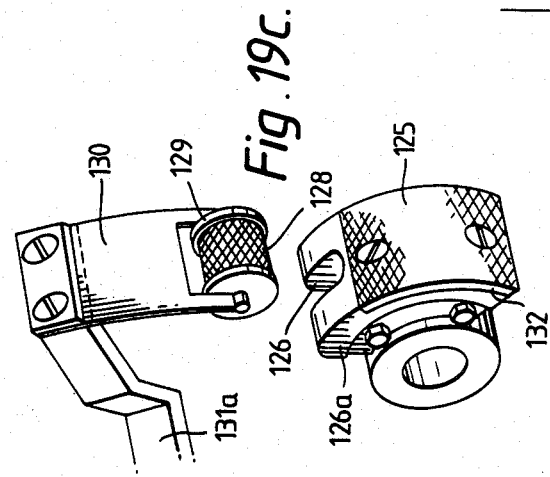

FIG. 19c is a perspective view of the tail removing mechanism (elements): 19c.125, serrated surface; 19c.132, element.

Figure 20:
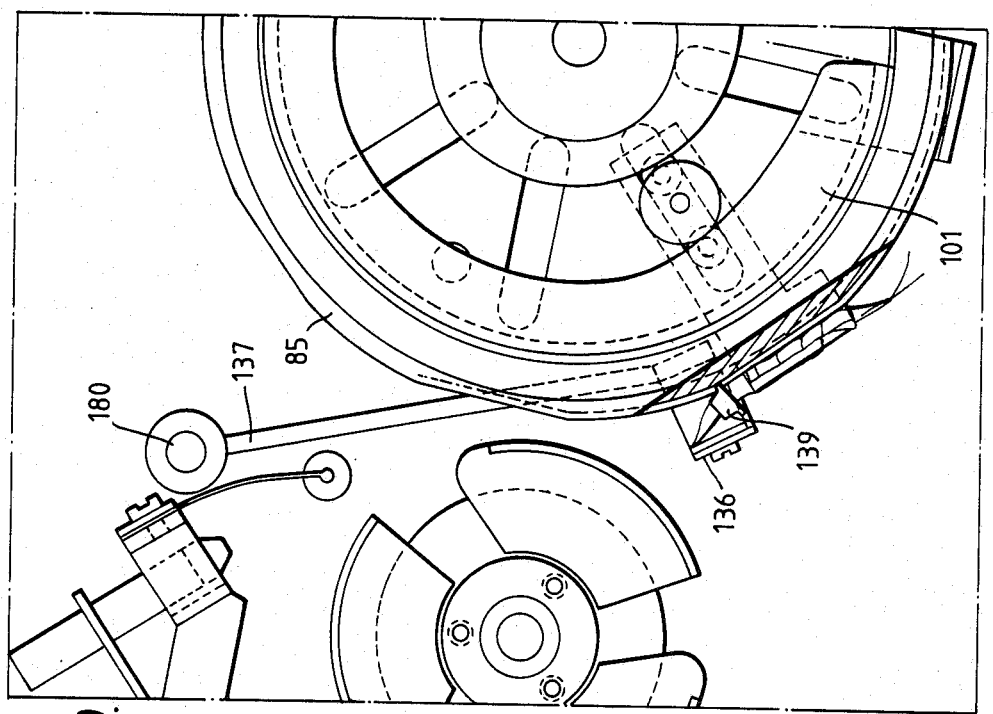

FIG. 20 shows the position of the ring stripper 20.136.

Figure 20B:
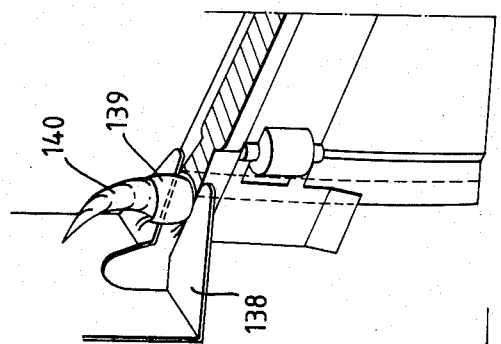
Figure 20A:
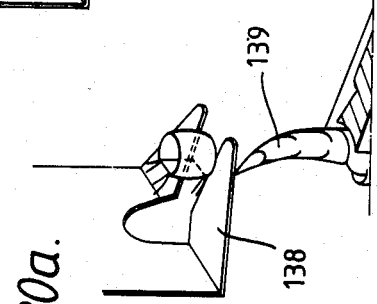

FIGS. 20a and 20b show the operation of the ring stripper.

Figure 21B:
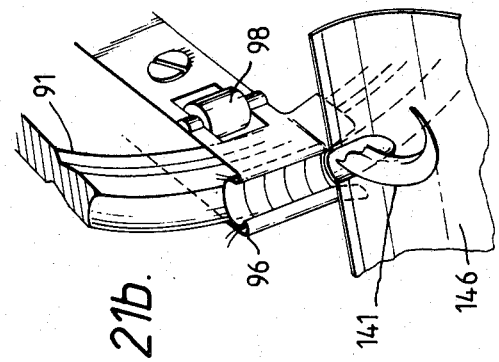
Figure 21A:
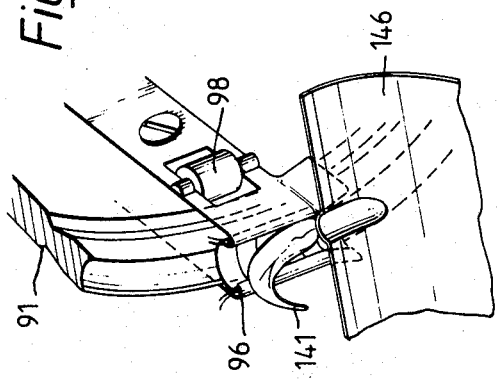
Figure 21:
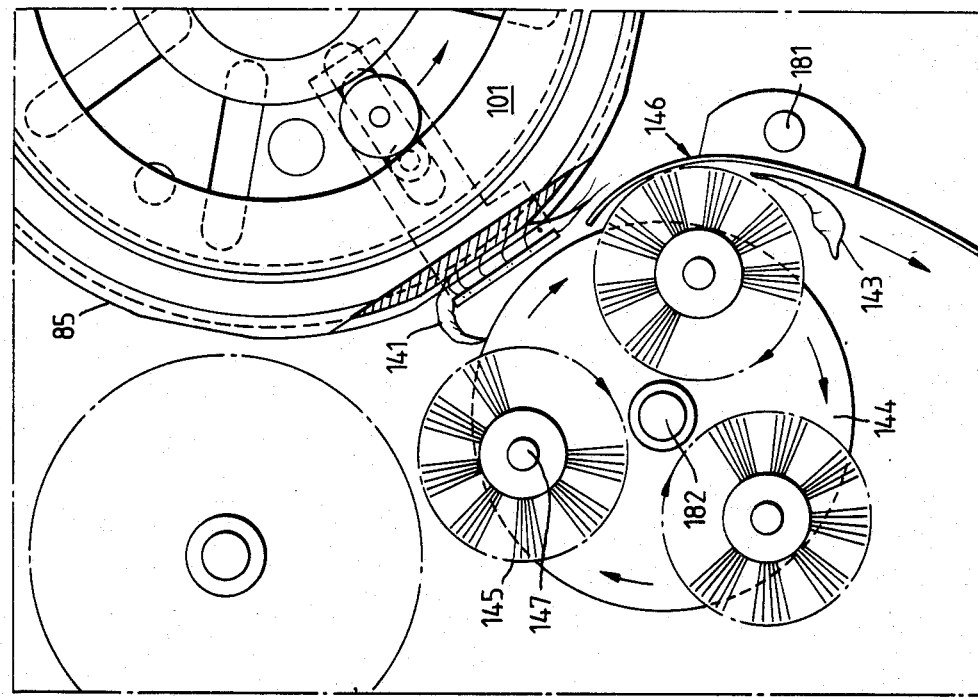

FIG. 21 shows the position of the opening mechanism for exposing the shrimp meat.

FIGS. 21a and 21b show the shrimp meat becoming exposed as a result of the peeling clamp being opened.

Figure 21C:
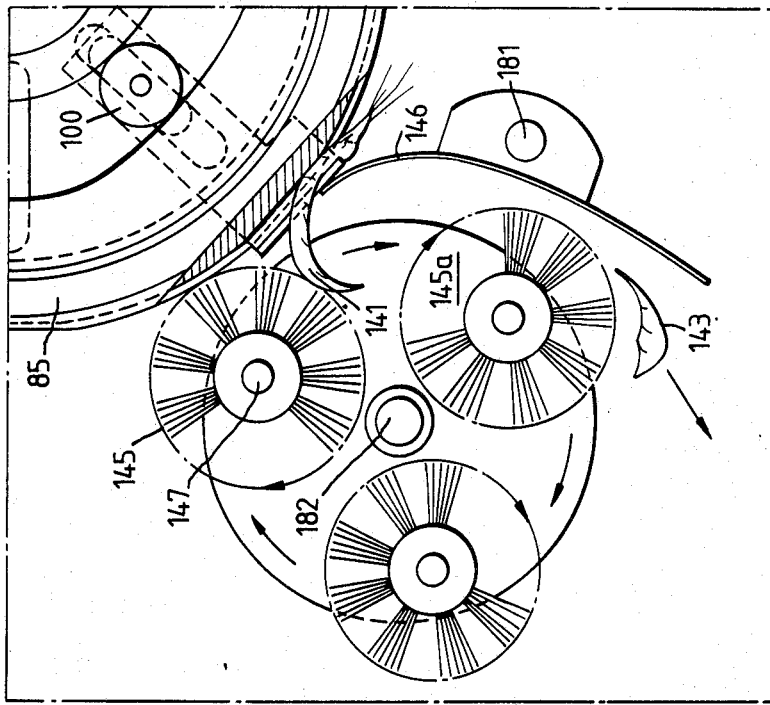

FIG. 21c shows the opened shrimp on the peeling disc, with the screening sheet 21c.146 over the head of the shrimp.

Figure 22:
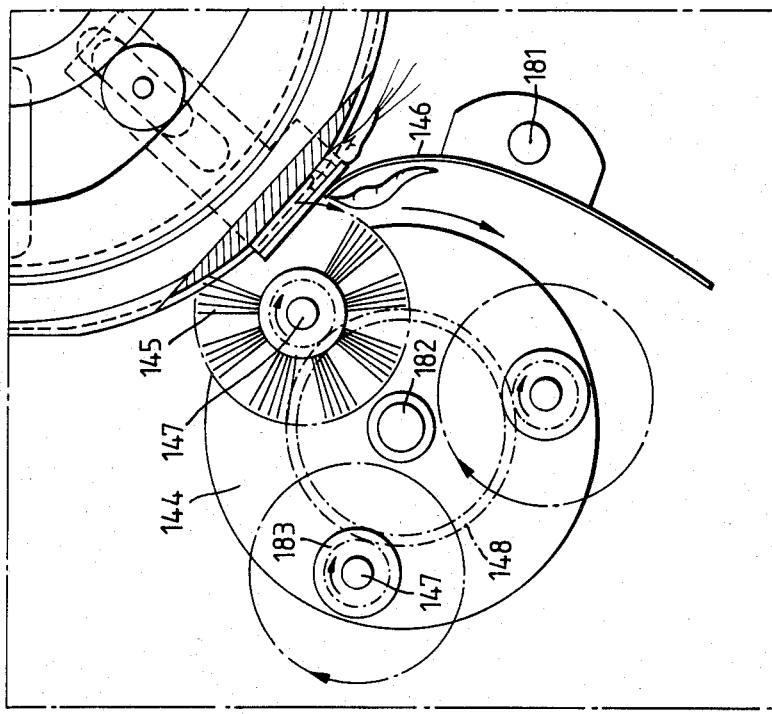

FIG. 22 shows the mechanism for removing the shrimp meat, 22.144.

Figure 23:
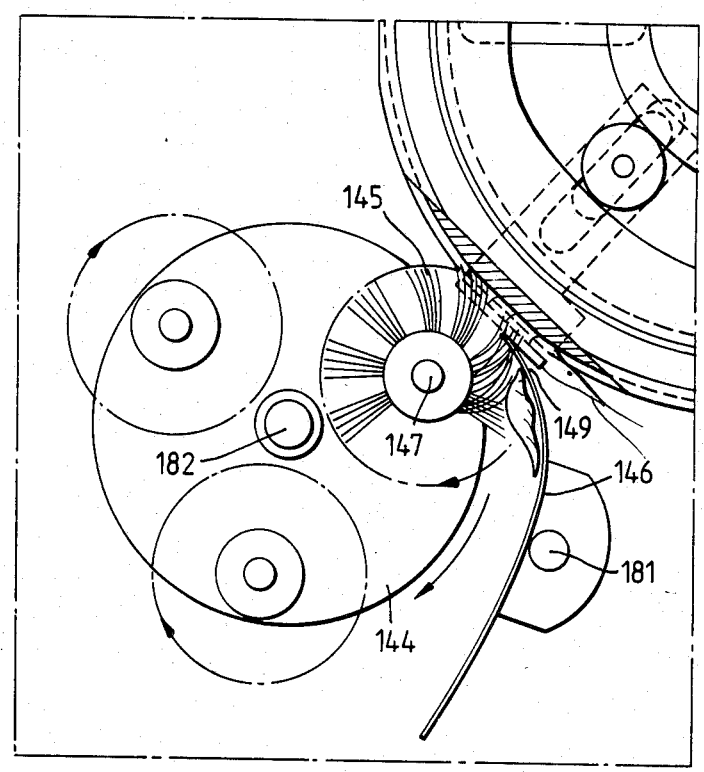

FIG. 23 shows how the shrimp meat is taken undamaged out of the shell.

Figure 24:
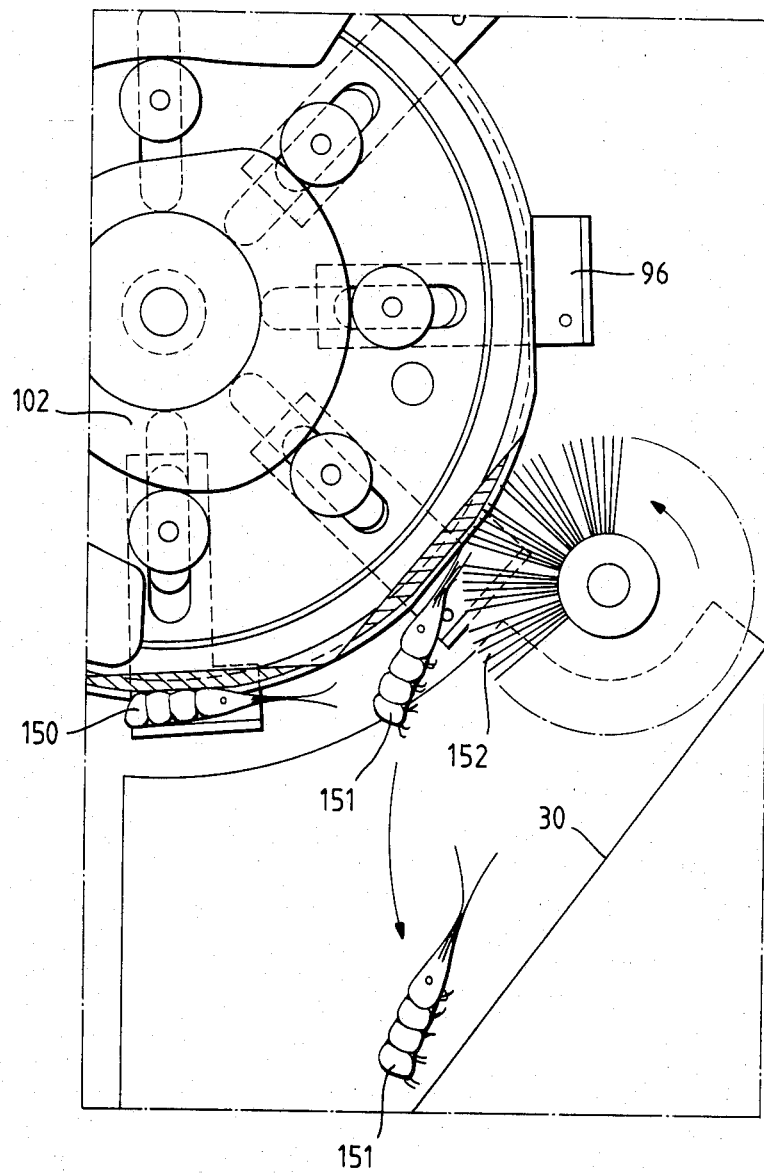

FIG. 24 shows how the empty shrimp shells are removed from the peeling clamps by means of the shell brushes.

Figure 1:
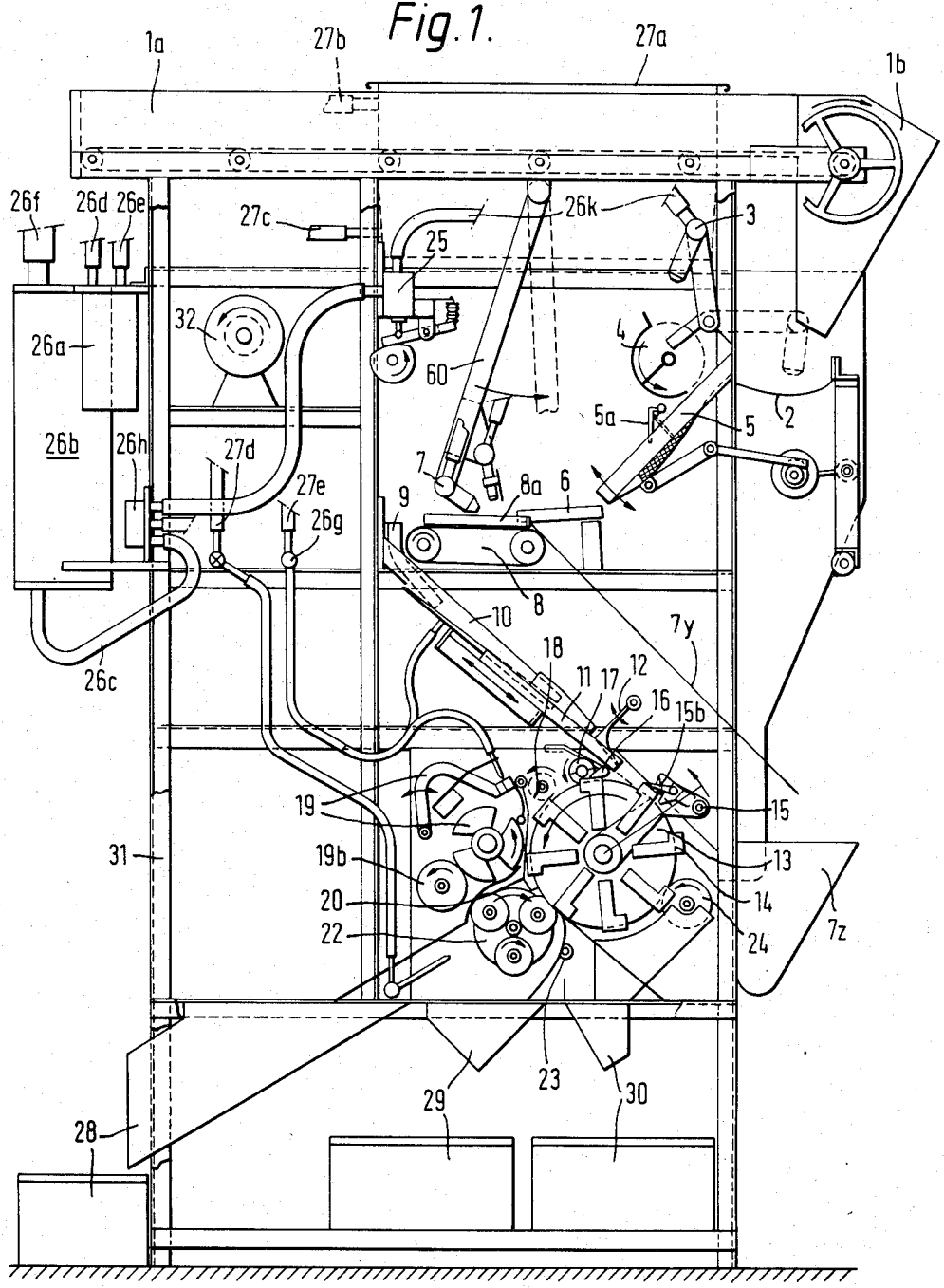

FIG. 1, item 25, shows the directed air-valve system.

FIG. 1, item 26, a-k, shows the air circuit.

FIG. 1, item 27, a-e, shows the water circuit.

FIG. 1, item 28, shows a receptacle for shrimp tails.

FIG. 1, item 29, shows a receptacle for shrimp meat.

FIG. 1, item 30, shows a receptacle for shrimp shells.

FIG. 1, item 31, represents the frame of the machine.

FIG. 1, item 32, shows a driving motor which is accommodated in the upper part of the frame.

METHOD OF THE VAN WOENSEL (MEGAPEL LIMITED) SHRIMP-PEELING MACHINE, AND SEQUENCE OF OPERATIONS FOR THE SHRIMPS TO BE PEELED

The consecutive peeling system implemented in the peeling machine operates on the one-by-one principle. The shrimps to be peeled are placed on the conveyor belt 2.34 of the machine, FIG. 1, according to the thickness size of the shrimps that can be processed by this machine. The conveyor belt 2.34 feeds with some overmeasure the quantity of shrimps capable of being processed by the peeling machine into a vibratory trough 2.35 with a flexible bottom 2.37. A number of suction mouths, FIG. 3a, corresponding to the number of peeling units assembled at the reciprocating bracket 3.45, become positioned each second in the dancing shrimps, see FIG. 3, sucking up one or two shrimps at each suction mouth, FIG. 3. During each return motion of this bracket, FIG. 4, because of the suction air changing to compressed air by means of the directed air-valve mechanism 1.25, these shrimps are fed into a so-called time divider 4.47, and at each revolution of the blade 4a.49 the shrimp(s) contained therein are pushed from second to second into a vibratory trough, see FIG. 4a. The shape and the slope of the vibratory trough, FIG. 5d, are so selected as to cause the shrimp(s) with the shrimp curvature 5a.56 to slide down, see FIG. 5a. Halfway the trough, FIG. 5b, the shrimp 5b.53 is held behind a synchro-controlled valve 5b.54. When the valve opens, the shrimp slides by the rounded part 5a.56 into a horizontal separating trough 5a.57, 5c.57 and FIG. 6. A reciprocating bracket 7.60 and 7a.60 of the separating mechanism, FIG. 7, provided with suction mouths 7.64, comes to meet the shrimp and sucks in one shrimp per suction mouth, 7b.65, and moves on up to one shrimp length from the end of the separating trough, FIG. 7c, causing any second shrimp 7c.66 which may be present to fall down and to be collected undamaged in a receptacle for re-use. During each return motion of the bracket 8a.61 the suction mouth 8a.64 releases the shrimp above a small conveyor belt 8a.70. This small conveyor belt conveys the shrimp 8a.73 to a vertically arranged return trough 8a.74, the shape of which causes the shrimp to slide down with the curved portion in front. The reversing trough, FIG. 9a, assumes a certain slope, FIG. 9.74, where the speed of the shrimp is determined. From this reversing trough, the shrimp slides into a so-called collecting and directional trough, FIGS. 10a and 10.75/77, which is arranged at a certain angle, FIG. 10. In the directional trough 77 the shrimp is straightened with the tail portion directed upward, FIG. 10.81. An adjusted amount of water flows without interruption through this directional trough 10.77, causing the speed and the transfer of the directed shrimp to be determined. The shrimp passes from this directional trough 11a.77 into a transfer trough 11a.84, which reciprocates in the longitudinal direction of the directional trough and virtually constitutes an extension thereof, 11b.84, so that it likewise displaces the shrimp with the speed of the water. At the end of this trough 11a.84, when this is in its upper position, FIG. 11a, is a regulating valve 11a.87, which synchronously passes the shrimp at the correct time, 11b.87, 12b. A vertically positioned circular peeling disc 11b.85, provided with eight peeling clamps 14g.88 which are automatically actuated upon rotation of the peeling disc, FIG. 14g, catches the shrimp exactly in the peeling clamp 13a.88 which has been turned in position when the regulating valve 11b.87 is opened. The peeling clamp, FIG. 14, consists of two spring leaves with flanged and hooking upper edge 14.96, connected to each other, FIG. 14d.95, by means of a slide block 14.95 which can move up and down in radial openings 14b.92 in the peeling disc. The height of the clamp opening with respect to the peeling disc, FIGS. 14d and 14e, for receiving the already directed shrimp 14e.99 is determined by a controlled rotation of the peeling disc, since the guide rolls 14g.100 follow and scan the guide tracks 14g.101 and 14g.102, the width of the opening being determined by the form of the lateral section of the peeling disc, FIGS. 13b.91 and 13c.91, use being made of the small guide rolls 14d.98 in the peeling clamps. The small pointed spring 14.97, 14g.97 is guided by 14g.101a.

When the shrimp enters into the peeling clamp it butts against a collecting and pushing mechanism 15a.103 which is periodically arranged behind the peeling clamp and is displaced along with the rotaton of the peeling disc, pushing the shrimp until exactly the three tail segments of the shrimp are not being clamped, FIGS. 15b and 15c, at which time the peeling clamp 15b.88 closes automatically upon the first displacement of the peeling disc and under the influence of the guide rollers 15b.100 and the guide tracks 15b.101 and 15b.102. Thereupon, the pushing mechanism 15b.103 having returned and the shrimp being clamped, FIGS. 15b and 15c, a tail-stretching mechanism 15b.106 bearing two conical arms 15c.110 and 15c.111 is dropped with these arms just behind the curved tail end, thus stretching the shrimp, FIG. 15c. During this first periodic displacement of the peeling disc, the clamped shrimp likewises passes a tail-straightening mechanism 16.112, causing the shrimp to pass in the stretched state during the second displacement, FIG. 16a.113 (16.113). While the shrimp passes this straightening mechanism 17.113, it passes underneath a rotating knife 17.114, causing the muscles on the ventral side of the shrimp to be severed, the shrimp being incised over its full length, FIG. 17c.114, without damage being caused to the shrimp meat. During the next displacement of the peeling disc (in each instance one eighth of the circumference), the incised shrimp passes a rapidly rotating rubber flap 18a.121, causing the three tail segments 18a.124 to become detached (before and during the third displacement). At the end of this displacement, FIG. 19, the three detached tail segments are positioned on an element 19.125 of the serrated tail-removing mechanism, FIG. 19, which is part of three elements, FIG. 19c and 19.132, arranged vertically in circular form, and having the same sense of rotation as the peeling disc. In this position, the tail is clamped by a roll 19.128 on the element 19.125 involved, FIG. 19, while immediately thereupon the newly displaced peeling disc pulls away the shrimp, the tail of which has been removed, FIG. 19a. The three tail segments remain behind on the element 19b.127. A rotating ejector brush 19b.133 wipes clean the element 19b.132, and the roller 19b.128 is kept clean with a small jet of water 19b.134. During the next, fourth, displacement of the peeling disc 20.85, the shrimp is laterally pulled open from the middle of its belly under the action of the hooking upper edges of the peeling clamps, FIG. 21a, the tail meat being released by directing these peeling clamps downward; see FIG. 21.141.

During this operation, the shrimp which has thus been pulled open passes with its tail portion a ring stripper 20.136, FIGS. 20a and 20b, the purpose of which is to remove any subsisting tail ring. A meat-removing mechanism 22.144, comprising a satellite brush 22.145, during the next standstill of the peeling disc rolls out the shrimp meat 21c.141; also see FIGS. 22 and 23. The head of the shrimp is covered by a screening sheet 22.146, 23.146 during this operation, so that only the meat becomes exposed and can be removed by means of the satellite brush 23.145. During the next two displacements of the peeling disc, the empty shell 24.151 (the horny covering) of the shrimp is swept out of the peeling clamp, which has opened in the meantime, under the action of a rotating shell brush 24.152; see FIG. 24.

All materials—shrimp meat, tails and shells—are collected separately in receptacles 1.28, 1.29 and 1.30. As the operations are taking place during the periodic and synchronized displacement of the peeling disc, each peeling clamp, having been turned into its proper position, is again filled with a shrimp, so that an uninterrupted chain of shrimps is continuously being processed. The embodiments can be constituted by a plurality of peeling units that are mounted side by side. For all machine types in these multiple-unit embodiments, a joint use is made per machine of the facilities constituted by the driving mechanism, the water and air systems, the supply of shrimps by belt conveyor, the vibratory trough, and the collection of shells, tails and shrimp meat, as well as the removal thereof.

NEW METHOD OF ISOLATING AND PEELING SHRIMPS ONE BY ONE IN A MECHANICAL PROCESS

The invention relates to a method and equipment for its implementation for isolating, giving a single direction to, conveying and peeling boiled shrimps one by one, in a synchronized manner, on time, and at mutually equal distances, out of a supply of shrimps from which impurities have already been removed, the supply of shrimps being maintained by horizontally arranged proportioning conveyor belt means (FIG. 1.1a); vibratory means for maintaining a continuous motion in and among a small quantity of shrimps (FIG. 1.2); vacuum means for gripping the shrimp without clamping (FIG. 1.3); means for releasing and collecting it undamaged; means for attaining a synchronized division of time (FIG. 1.4); means for turning the shrimp with the curvature in forward direction and its transportation (FIG. 1.5); means for retaining this shrimp and passing it on time with the curvature of the shrimp directed forwardly (FIG. 1.5a); means for gripping and detaching the forwardly directed shrimp, for repelling a second, undesired shrimp, and for rejecting a wrongly positioned shrimp (FIG. 1.6 and item 7); means for conveying (FIG. 1.8) and fully straightening an already isolated shrimp (FIG. 1.9 and item 10); means for the further transportation (FIG. 1.11), retention (FIG. 1.12) and synchronized, timely, directed passage of this shrimp; means for maintaining the straightened position with the aid of a collecting and straightening mechanism (FIG. 1.15), with the curvature of the shrimp in the straightening element, the back of the shrimp downwardly directed and the tail upwardly directed, resting upon a supporting element in the form of a vertically arranged round disc (FIG. 1.13); gripping and clamping means (FIG. 1, item 14) for clamping and holding the shrimp; stretching elements (FIG. 1, item 15b) for fully stretching the tail; a straightening element (FIG. 1.16) for keeping the tail properly directed; a cutting element (FIG. 1.17) for fully incising the shrimp over the entire length from the peritoneum to the extreme tip of the tail; a vibrating element (FIG. 1.18) for detaching the non-clamped tail; removing the tail shell by means of a tail-pulling mechanism (FIG. 1.19); removing any subsisting ringlets of the tail shell by means of a stripping element (FIG. 1.20); completely opening the horny shell of the shrimp by means of the aforementioned gripping and clamping means; shelling the shrimp meat in a rolling motion by means of a brush mechanism (FIG. 1.22); collecting the shrimp meat with the aid of a screening mechanism (FIG. 1.23); removing the empty shrimp shell from the clamping mechanism by means of a brush element (FIG. 1.24).

SPECIFICATION OF THE PROCESS

Figure 4:
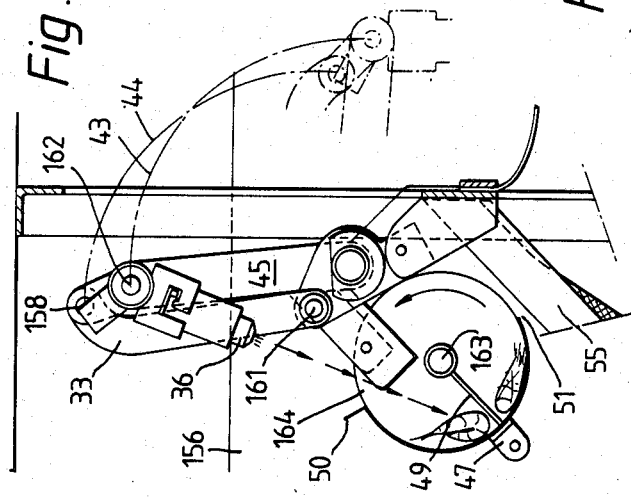
FIG 4 is a diagram of the time divider, FIG. 4.47, with the suction mouth 4.36 of the suction bracket in operation above the time divider during the repulsion of the shrimp.
Figure 4A:
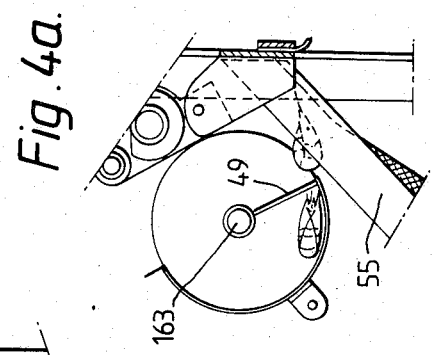
FIG. 4a shows the time divider, while the shrimp is being brushed out of it exactly on time by the action of the rotating plate, FIG. 4a.49.

Maintaining a supply as well as proportioning of the shrimps takes place by means of a horizontally arranged conveyor belt system and the driving means required for this (FIG. 1.1a). According to this method, the supply of shrimps remains untouched, this being desirable for preventing damage to the shrimps. This is not the case either in Netherlands Pat. No. 156,304 or in Netherlands Pat. No. 168,690, since the quantity of shrimps there kept on hand is constantly being stirred: in the former case because the mass of shrimps is continuously being moved upward; in the latter case because of the shrimps being dredged by the surface from a trough by means of a conveyor belt ladder. On account of these methods the shrimps can be so damaged that, once they have arrived in a coupled peeling system, the peeling effect can be impaired. Although Netherlands Pat. No. 156,307 provides for a device for removing damaged shrimps, costly machine strokes related to a coupled peeling mechanism are nevertheless lost. According to the novel method as referred to in the following specification, a regularly proportioned quantity of shrimps regularly leaves the aforementioned conveying mechanism and reaches a smaller supply holder which keeps a smaller quantity of shrimps in constant motion by means of a vibratory mechanism (FIGS. 2 and 3). This process is achieved by using a flexible bottom (FIG. 2.46) which is maintained in the vibrating state by a revolving eccentric mechanism (FIG. 2.39). Because of this method, the shrimps mutually exchange positions, which is necessary for enabling the shrimps, at the moment in which a number of suction mouths penetrate into this supply, to jump against these suction mouths and to be sucked against them (FIG. 3.36), in which operation they are naturally engaged nonviolently, in contrast to the prior-art methods in this field where use is made of grippers and the like. According to the method referred to in the present application, it furthermore is immaterial in what way the shrimps are picked up by means of the suction mouths or suction elements. Another advantage of this method is that it allows the shrimp to be engaged at any prearranged synchronized time from a supply as described. Engaging and detaching shrimps according to this process as compared to prior-art systems offers a major improvement in that no violence is applied to the shrimps; the form of embodiment is moreover very simple. The release of the shrimp sucked in (FIG. 4), however, does not take place exactly on time, which is due to the moisture content of the shrimp, its weight, the manner of engaging by the suction elements, etc. In order nevertheless to arrive at an exact time schedule for the shrimp, such as one per second, means are intercalated for dividing the time for the synchronized continued transportation of the shrimp (FIGS. 4 and 4a), which means are synchronized by means of driving means with respect to the moment in which the shrimp would leave the suction element involved at the earliest, as determined by the aforementioned factors, and the adjustment of a likewise synchronized air-valve mechanism (FIG. 1.25). The interposed time-dividing mechanism consists of a semicylindrical housing fixed in a permanent position (FIG. 4.47), in which a centrically driven sweeping element, in this case a blade (FIG. 4.49), is rotating. This blade, in the moment of the shrimp being repelled by the suction element, virtually constitutes a receptacle (FIG. 4). According to this method, the exact moment of the shrimp being collected in it is immaterial, and it can take place with a certain amount of tolerance as to time, since it is only at the next passage of the blade, or of the sweeping element, that this shrimp is swept outside the cylindrically shaped housing (FIG. 4a). This allows attaining a fairly high frequency in the time division for the individual shrimps for the purpose of a high production rate. The method thus implemented also means that the preceding shrimp is absolutely separated from the next (FIG. 4), so that separate treatment of individual shrimps is ensured and scheduled exactly as to time. This method allows additional mechanical operations to be performed at the individual shrimp without interference from a subsequent shrimp. The shrimp will leave this time-dividing mechanism (FIG. 4a) in a random manner. Because of the speed of rotation of the sweeping element, this shrimp is introduced into a reversing element (FIG. 5), where the shrimp is forced to slide along a roughened surface, in this case a wire fabric bottom (FIG. 5.52) in the reversing element, the purpose of which is to turn the shrimp with its smooth, rounded underside into the sliding direction, in part under the influence of the slope and the vibrations performed by this sliding plane. Because of the structure of the wire fabric bottom surface, any adhesion of moisture and the like to the shrimp is avoided as well, which adhesion would definitely take place on a solid background, which would be liable to interfere with the forward sliding motion. In order to prevent the shrimp, after it has been turned, from sliding forward at too high a speed, which could happen in the case of very fresh shrimps, a retaining element (FIG. 5.54) is provided in the last part of the reversing element, the purpose of which is also, after having been adjusted synchronously, to retain the shrimp on time with a certain amount of play (FIG. 5.53), to pass the shrimp on time (FIG. 5a.56), and to cause it to arrive just thereafter in a collecting element (FIG. 5a.57), in this case a collecting trough of what is called a separating mechanism (FIG. 5c.59). The shrimp is then already directed with its rounded part in the direction of transfer, in which the tail, turned sideways, can extend to the left or to the right (FIG. 6). This method also allows a high frequency to be attained, the position of the tail portion of the shrimp being immaterial. It could possibly occur in practice that two shrimps already at the start of being engaged one by one (FIG. 7b.65 and item 66) from the supply arrive simultaneously in the separating trough of the separating mechanism (FIG. 7a). Any such problem, however, is obviated by the configuration of the separating mechanism (FIG. 7), which keeps a second, undesired, shrimp absolutely separated from the shrimp which is being let through (FIG. 7b). The separating mechanism furthermore causes the removal of any shrimp which may be positioned in an undesired direction, i.e. with the head with antennae in the direction of transfer (FIG. 7c), it being repelled and collected for re-use in the undamaged state, just like a second, undesired, shrimp (FIG. 7c.66). The separating mechansim also arranges the repulsion of loose shrimp heads and such hard objects as tiny molluscan shells and the like. The separating mechanism (FIG. 7) is composed of suction elements (FIG. 7d.64), blowing elements (FIG. 7d.68) and transit-determining screening means (FIG. 7.67), and makes according to the manner of embodiment a reciprocating motion (FIG. 7a), in the course of which the suction elements at specific moments can perform a controlled function. This method of operation is brought about by interposing a synchronously adjusted air-valve mechanism (FIG. 7c.25), allowing at any desired moment the shrimp to be engaged and released undamaged. This release takes place after the separating process (FIG. 8a), the shrimp being placed on a conveyor belt element, a directional correction furthermore being performed for the shrimp as it leaves the belt, use being made of a special end pulley in conjunction with the belt element (FIG. 8). The shrimp during this procedure is kept straight as well as forced into a different direction of advancement, which is necessary for implementing the method for the straightening mechanism as described in the specification of the machine. Upon leaving the belt element, the shrimp, having already been predirected, follows a trough construction (FIG. 10.74 and item 75), the aim of which is to perform a procedure of imparting a fully identical direction to the shrimps among each other, i.e. with the curvature forward in the sliding or transfer direction, and with the tail portion directed upwardly. This process is brought about by a continuous sliding motion of the shrimp, which is so monitored and controlled that, in the first phase, as the shrimp leaves the belt element, it is collected backward and guided through a vertically arranged sliding trough (FIG. 9.74), in the course of which the tail portion of the shrimp is already directed slightly upward without enabling the shrimp to change its longitudinal direction, whereupon, during the second phase, which connects to the first, the tail portion is fully directed upwardly, use being made of a sloping collecting trough with coupled sliding duct (FIG. 10.77). The step-by-step representation of the implementation of the process takes place in actual practice in one smooth, inclined motion. The embodiment as described for the machine has the aim, according to the method specified hereinbefore, of imparting the proper direction both to properly curved and to incompletely curved shrimps. Insofar as improperly curved shrimps are concerned, they are selected out according to Netherlands Pat. No. 156,307. In order to ensure continuous transmission of the already straightened shrimp, use is already made in part of the second phase of a propulsion means in the form of a small jet of water. The purpose of this, however, is a multiple one, namely, ensuring the propulsion of the shrimp and imparting equal speed to each shrimp (FIG. 11b); continuous flushing of narrower trough portions, etc.; the forced introduction into a coupled peeling unit or similar processing machine (11b). In Netherlands Pat. No. 168,690, as in most patent specifications of peeling machines for shrimps, use is made of vibrating troughs, etc.; this, however, does not provide any guarantee for satisfactory propulsion of the shrimp within a predetermined time limit of for instance 0.5 sec. per shrimp. For the synchronous introduction of the shrimp into a coupled peeling unit, it is important to retain the shrimp just before its introduction (FIG. 11a.87) and to allow it to pass at exactly the adjusted time in a 100-percent correctly directed position (FIG. 11b); to this end, a retaining element (FIG. 11b.87) is provided in the terminal part of a transfer trough (FIGS. 12a and 12b) as shown in the machine. The closing and opening time of this retaining element moreover allows the shrimps coming from the belt element a suitable tolerance in the time limit imposed for following the sliding troughs. This system allows a fairly high frequency in feeding shrimps having a different sliding ability, smooth as well as less smooth shrimps, in identically directed positions to a coupling peeling unit for shrimps. The shrimps offered for peeling are collected backward on a vertically arranged round disc (FIG. 1.13) having approximately the thickness of the average shrimp which the particular machine for peeling them can process. The shrimp being treated arrives properly directed with its back on the disc, the tail portion turned upward, and with the head of the shrimp in the direction of rotation of the disc, which furthermore underdoes a periodic rotation by means of various driving elements. The disc is provided at its periphery with eight radially positioned gripping or clamping elements (FIG. 1.14) for keeping the shrimp clamped on the disc in the proper position. It is caught by these clamps at the start, and held upright by directional elements. This is necessary for satisfactory peeling results to be achieved. The clamped shrimp repeatedly underdoes a displacement along with the rotation of the disc, this displacement corresponds to one eighth of the circumference of the disc; in each instance, a new clamping element is rotated into position, constituting the filling position, e.g., each second. During the rotation and dwell periods of the disc, the shrimp which has been taken in undergoes again and again another treatment by means of the aforementioned elements and means, the shrimp having been automatically fixed by the clamping elements during the first displacement of the disc. At the beginning of this process the shrimp is brought into the proper position by a collecting and pushing mechanism (FIG. 1.15), whereupon the tail is stretched by a stretching element (FIG. 1.15b). The thorax of the shrimp is then firmly clamped on the disc as a result of the clamping elements being closed (FIG. 14c). These initial operations of the collecting elements, directional elements and stretching elements cause the shrimp to be positioned for 100 percent correctly to be submitted to the operations for the peeling process. According to Netherlands Pat. No. 159,865 the shrimps are collected by means of vacuum and held during the rotation of a so-called vacuum peeling drum; in this process, however, the shrimp is not brought into an exact position, and there will often be the chance at the very beginning that it will lie askew. Such a crooked position of the shrimps with the use of such a method is liable to lead to random results of peeling because, during the incision of the shrimp, the tail portion is not always correctly incised. According to the novel method as described hereinafter, the mechanically clamped shrimp, having been stretched, is passed with its tail portion under a tail-straightening element (FIGS. 16 and 16a) before being conveyed underneath a cutting element (FIG. 16a.114). The process of keeping the shrimp straightened before and during the incision of the peritoneum and the muscles extending along the belly of the shrimp, which incision is made during the displacement of the peeling disc, causes the peritoneum of the shrimp to be incised 100 percent symmetrically exactly along the central axis from the head to the extreme tip of the tail (FIG. 17c), in such a way that the shrimp meat remains untouched by parts of the cutting element. During the continued rotation of the disc, with the incised clamped shrimp, the tail, having sprung up slightly again, is loosened by a vibrating element (FIG. 18a.122); as a result, the horny shell of the tail is removed without any problem by means of a tail-pulling mechanism (FIG. 19) during the next standstill of the peeling disc. The implementation of the process by this mechanism is described in further detail in the specification of the relevant machine. The advantage of the use of this method is that the tail, before being removed, is first automatically stretched under the action of the element upon which the tail arrives (FIG. 19.125). This method allows removing the horny tail shell both in the case of shrimp tails which are curved very well and in that of less well-curved shrimp tails. Subsequently to the removal of the horny tail shell, the shrimp passes a stripping element (FIG. 20.136) for removing any subsisting tail ring. This operation, like all preceding operations, is carried out periodically with the aid of a synchronized adjustment. Complete exposure of the shrimp meat of the shrimp where the horny tail shell has been removed and the peritoneum is already incised is obtained by opening the clamping device (FIG. 21a), which takes place automatically during displacement of the disc, the clamping device furthermore being provided with means capable of grasping and holding the thorax shell of the shrimp (FIG. 21a.96). The shrimp meat, once exposed, is rolled out by brushing elements during the next standstill of the peeling disc, and collected by a screening sheet (FIG. 23). This method is preferable to blowing out with air, or squirting out with water, as specified in Netherlands Pat. No. 159,865. The shell which has been released is thereafter removed by a brush. The process of shrimp meat being rolled out by means of brushing elements allows the shrimp meat to be obtained undamaged, in which the boiling process of the shrimps does not play a primary part. The shrimps can likewise vary with respect to the curvature of their tails, which makes the embodiment of a machine according to this method a responsible solution for practical use as required for the supply and processing of shrimps.

INSTALLATION FOR IMPLEMENTING THE METHOD SPECIFIED FOR INDIVIDUALLY ISOLATING, STRAIGHTENING, CONVEYING AND PEELING SHRIMPS

Figure 22A:
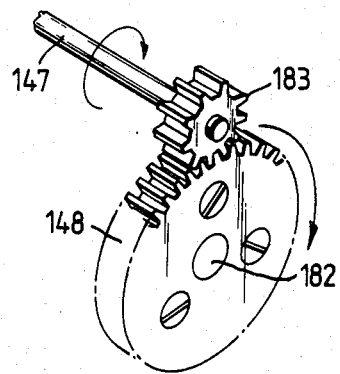
Figure 23A:
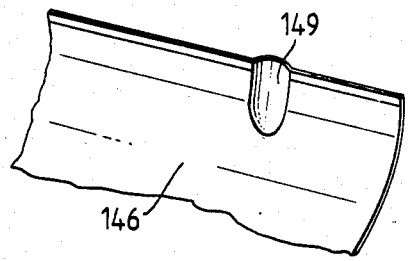

The installation according to the method and the invention specified is accommodated in a frame (FIG. 1) which is constructed for this purpose of stainless steel and durable plastics. The horizontally arranged belt conveyor (FIG. 2.34) is moved by driving means not further specified, the diameter of the driving wheel (FIG. 1) being one of the factors which determine the proportioning of the shrimps being supplied, which are provided in a layer of a given thickness upon the belt. The conveyor belt is roller-supported, contrary to a sliding support for the bearing surface of the belt, to which dirt can adhere. The surface of the belt is closed on the sides by means of battens, underneath which the belt can freely rotate, for the purpose of preventing the shrimps supplied from getting under and between the belt. The conveyor belt system can also be replaced by a transfer system constituted by a vibrating basin, but correct proportioning from this is influenced by the momentary structure of the shrimps. Proportioning by means of the belt conveyor solves these problems and is to be preferred. In order to engage the shrimps from the mass virtually one by one, it is necessary for them to become detached from each other and not to lump. To this end, proportioning of smaller quantities is provided for into a vibrating receptacle (FIG. 2.35), where the shrimps are kept moving (FIG. 3). This vibratory receptacle is built up from a movable frame construction (FIG. 2.38) which is hinged by means of a hinged construction (FIG. 2.153); a reciprocating movement is produced by the construction being connected to an eccentric mechanism (FIG. 2.39) or a vibratory unit. The rotational speed and the stroke of this mechanism determine the vibration of the flexible bottom (FIG. 2.37). Since the flexible bottom is fixed to the frame of the installation (FIG. 2.154) and also attached to the clamping device (FIG. 2.155), a certain reciprocating horizontal motion (FIG. 2.46a) will also result in a reciprocating vertical motion of the flexible bottom (FIG. 2.46). This will cause the shrimps to assume a dancing motion, jumping through each other, so that they change places continuously (FIG. 3). The flexible bottom is left free on the sides, allowing the motion (FIG. 2.46) to be performed freely. In the embodiment of the installation, however, the side is locked up in structural lateral plates, as shown in the example (FIG. 2.156). In order to make it practically feasible to engage the shrimps from this moving quantity one by one, a system has been selected in which use is made of a certain suction force by means of vacuum air. This application is attained by the construction as shown in FIGS. 2, 3 and 4, in cooperation with a pressure-vacuum installation and the controllable, synchronously adjusted air-valve mechanism (FIG. 1.25). An exploded view of this situation is shown in FIGS. 2, 3 and 4. The overall reciprocating arm construction (FIGS. 2.45, 3.45, 4.45) is controlled by means of the shaft which is fixed thereon (FIG. 3.157) and which is traversed with the aid of driving means, in the course of which it is subject to an angular displacement. The movement is shown in FIGS. 3 and 4. The suction tube 42, hinged between the arms 45 and the counter-arm 45a, not shown (see FIG. 3), bears a number of spaced suction elements (FIG. 3.36) as shown in FIGS. 3, 3a, 3b and 4. These undergo, in the course of the reciprocating motion as shown in FIGS. 3 and 4, an angular displacement of about 30 degrees with respect to the vertical position of the suction elements in FIG. 3. In order to achieve the angular displacement, a hinged intermediate arm is provided in the constructon (FIG. 3.33), one end of which (FIG. 3.158) is loosely hinged to a fork 159, which itself is fixed to the suction tube (FIG. 3.42). The other end (FIG. 3.160) is hinged to a fixed point with respect to the frame construction (FIGS. 3.161 and 4.161). Thus, upon the suction-tube construction being displaced, the hinged intermediate arm (FIGS. 3.33 and 4.33), while unable to deflect in point 161, is able to do so in point 158. The suction tube being hinged (FIGS. 3.162 and 4.162) to the hinge arms 45, the result consists in the aforementioned angular displacement of about 30 degrees, of which imaginary generating lines, formed during the movement, are shown in points 43 and 44 of FIGS. 3 and 4. The angular displacement of the suction tube, and therefore of the suction elements as well, allows the shrimp which has been sucked in to be discharged in a directed manner into a collecting element which is situated outside the vibratory basin and having the form of what is called a time-dividing mechanism; FIGS. 3.47 and 4.47 present an exploded view of this. The construction comprises a semicylindrical tube with partitions for adjacent compartments, point 50 being the inlet opening and point 51 the outlet opening of the mechanism. The cylindrical shape is detachably provided between the structural plates of the installation, in such a way that it is arranged in the form of a circle with respect to the central shaft (FIG. 3.163), and remains centered because of the circular central position provided on the structural plates (FIG. 3.164) and the counterside, not shown. The centrally located shaft 163 turns toward the left (FIGS. 3, 4, 5) and is supported in the structural plates (156, 156a), in which, furthermore, all shafts shown in the installation are supported, except for the peeling part, which is accommodated in the peeling unit and coupled thereto. The shaft 163 performs one revolution while the suction installation (FIGS. 3 and 4) carries out one reciprocating movement. The shaft 163 bears a fixed but adjustable sweeping element in the form of a small, solid partition plate (FIG. 4.49) which runs clear of the inside wall of the aforementioned cylindrical shape (FIG. 4.47) with a play of about 2 mm. FIG. 4 shows how the rotating separating plate 49 keeps the newly arrived shrimp separated from the next one. The position of the small separating plate is synchronously adjusted with respect to the extreme standstill position of the suction mechanism when the shrimp is repelled (FIG. 4). In order to collect the shrimp which, in FIG. 4a, is leaving the time-dividing mechanism and meanwhile to turn it with the curvature in the direction of transfer, a reversing element is provided which is designed as a special vibratory trough (FIG. 5d). This vibratory trough, positioned as shown in FIG. 5, is provided with a fine-mesh bottom of wire fabric having a special shape (FIGS. 5 and 5d). The wire fabric is embedded in a stainless steel casing, the lower end of which forms a broad, rounded duct (FIG. 5d). The overall trough structure is suspended at points 165 and 166, see FIG. 5, in such a way as to be capable of vibrating. A simple vibrating motion of high frequency is produced with the aid of a vibrating arm 58 (FIG. 5) and an eccentric 39a. The retaining element 54 (FIGS. 5, 5a, 5b), the shape of which is shown in FIG. 5e, is so positioned as to be capable of moving up and down in the aforementioned vibratory trough, in such a way that it can occlude the vibrating wire-mesh bottom of the vibratory trough at synchronized moments. To this end, the valve as shown in FIG. 5e is attached to a reciprocating hinged shaft (FIG. 5a.167). The position, shape and motion of the valve are so selected that the contacting shrimp, as in FIG. 5b.53, is not impeded when the valve is opened (FIG. 5a). For the purpose of collecting the shrimp, which has passed on time, a collecting element, called the collecting and separating trough, is fixed in the installation (FIG. 5a.57). The shape of this trough 57 is shown in FIGS. 6 and 7. This short and half-round separating trough is placed in a slightly inclined position, and connects above a belt conveyor element (FIG. 7a.70). The oblique arrangement of the trough 57 has the purpose of collecting the shrimp in a retarding alighting track when it leaves the vibratory trough (FIG. 7a.165) in such a way that the arriving shrimp does not topple over before contacting the oncoming suction mouth (FIG. 7a.64) of the suction bracket 60 in front of the separating mechanism (FIGS. 7a.64 and 7b). The separating bracket, or suction bracket (FIG. 7a.60), is pin-pivoted, and is reciprocated from the hinge pin 167. The composition of the part where the suction mouth and the nozzles are located is shown in FIGS 7 through 7d. The suction mouths 74 and nozzles 68 as shown in FIG. 7d are adjustably connected to the bracket structure (FIG. 7.60). The nozzle (FIG. 7d.68) bears a small cover plate (FIG. 7.67) in such a way that its underside, during the reciprocating motion, just runs clear of the trough 57. Its aim is to define a height of passage with respect to the bottom of the trough (FIG. 7.57). The suction mouths (FIG. 7.64) are removable by means of a small bracket (FIG. 7.168), for which purpose the nozzle structure (FIG. 7.61) has been made detachable by means of a hand screw (FIG. 7.62). The overall construction performs a multiple operation as indicated in the method of operation. The blowing and suction moments of the nozzles and suction mouths are synchro-controlled by the air-valve mechanism as shown in FIG. 1.25. For the further transfer of the shrimp, a conveyor belt element as shown in FIG. 8a is provided. FIG. 8 shows its form of embodiment, the driving pulley 71 of which has a special shape. This shape has been selected to enable the shrimp to be straightened as it leaves the belt. The small, resilient rubber conveyor belt (FIG. 8a.70) is tensioned around the section of the pulley, causing the shape of a trough to result (FIG. 8). The belt is so arranged as to be slightly upwardly inclined in the direction of motion of the belt; this prevents the shrimp from toppling over during its downward motion (FIG. 8a). FIGS. 8a, 9 and 10 show how the shrimp arrives in a system of sliding troughs. These troughs are necessary for straightening the shrimp and have a special shape. FIG. 9a shows the form of the reversing trough 74, which is also seen in FIGS. 9 and 10. The reversing trough 9a.74 is rounded lengthwise and exhibits a smooth transitional transverse curvature: at the top a wide curvature, and toward the bottom a smaller semicircular form. From the middle of the trough, the end is deisgned cylindrically. The reversing trough is permanently fixed to the frame of the installation (FIG. 10.169) in such a way that it is located just below the belt conveyor, and connects at an angle to the interior of the collecting and directing trough (FIG. 10.75). This collecting and directing trough is likewise permanently fixed to a frame construction of the installation as shown in FIG. 10.170. The form of the collecting and directing trough is shown in FIG. 10a. This trough is composed of a straight collecting trough 75 with a semi-cylindrical bottom comprising a cut-out slit 76 (FIG. 10a), underneath which is connected a U-shaped trough 77 which has almost no size or extent at the water inlet (FIG. 10a.80) and ends in a U-shape. This is also shown in FIG. 10, where the beginning lies at point 75 and the deeper part at point 77. FIG. 11 shows a transfer trough construction, the context of which becomes clear from FIGS. 11a and 11b; according to FIGS. 11a.84 and 11b.84 the trough can reciprocate over a certain distance. This is brought about by various synchro-adjusted driving means. The troughs are arranged in a solid gliding block (FIG. 11.171) equipped with slide supports and rods (FIG. 11a.173) parallel to the mounted troughs as shown in FIGS. 11, 11a and 11b. The embodiment of the installation accommodates in the bottom half, i.e. the lower part of the transfer trough, a retaining element 87 which is functionally positioned in the form of a regulating valve. FIGS. 12a and 12b, item 87, clearly indicate how shrimps are checked and thereafter passed through at a synchronized moment, the motion for which is produced as shown in FIGS. 11a.87 and 11b.87 with the use of driving means imparting an angular displacement to the shaft 172 on which the regulating valve is fastened; this allows the regulating valve 87 to be opened and closed so as to pass a shrimp on time. A vertically positioned round disc (FIGS. 1, item 13), the peeling disc (see FIG. 14g), the circumference of which serves as a supporting element for collecting a shrimp backward, as indicated in detail in the method and in FIG. 13a, is constituted by a round disc 85 of plastic material, having eight radially provided complete recesses or openings (FIG. 14b.92), and is furnished with flattened areas at the periphery, right above the aforementioned recesses and at right angles thereto (FIG. 15b.90), having the form of chords. The internal sections of these flattened areas, the so-called seats as shown in FIG. 13b.90, along the section X-Y as shown in FIG. 13a, are somewhat groove-shaped, and serve for symmetrically accommodating the back profile of the included shrimp (FIGS. 14a and 14d). FIG. 13c, along the section P-Q, shows in point 89 a section of a groove profile constituting the internal section of the remaining circumferential part of the peeling disc. This groove passes smoothly into the groove provided in the so-called seating site of the shrimp and serves for centering the shrimp tail when this is being stretched (FIG. 15c). The peeling disc is provided with eight gripping o clamping elements (FIG. 14g.88), called peeling clamps, as shown in FIG. 14. These peeling clamps are the clamping elements between which the shrimps are collected for undergoing the peeling cycles, as described and specified in the method. In order to cause these peeling clamps to perform their function, the peeling disc is furthermore provided with lateral contours as shown in FIGS. 13a.91, 13b.91 and 13c.91. Cooperating with the rollers 98 which are arranged in the peeling clamps (FIG. 14), the peeling clamps, while performing their controlled up-and-down motion in the peeling disc, will cause the rollers 98 to scan the contours; this is shown in FIGS. 14d.98 and 14a.98. The controlled up-and-down movement of the peeling clamps is produced automatically when the peeling disc is displaced, in each instance, by one eighths of its circumference, in FIG. 14g toward the left, as a result of the guide rollers (FIG. 14g.100), which are provided in the peeling clamps 88, scanning the guide tracks 101 and 102; also see FIGS. 14a and 14d. Under the opening and closing action of the peeling clamps, a predetermined grip of the peeling clamps is produced at any desired moment upon the standstill and displacement of the peeling disc in cooperation with the guide rollers and tracks (FIG. 14g), there being no question of random or arbitrary operations such as are observed, for example, in establishing contact with the use of vacuum air (Netherlands Pat. No. 159,865), FIG. 13a indicates how the shrimp as shown in FIG. 11b arrives on the peeling disc and is caught between the peeling clamps 88 of FIG. 13b. The shrimp must be collected, supervised and held upright during this process. This is achieved with the use of a collecting and pushing mechanism (FIG. 15a.103), the collecting element 104 and the directing element 105 of which are shown in FIG. 15d. The unit, composed of a small plastic block with a stainless steel collecting cap (FIGS. 15d.105 and 15a.105), is attached tiltably, by way of the small block 104, to the stationary shaft 109 in FIGS. 15a and 15 (top view). This shaft 109 itself is fastened to a reciprocating, controlled arm (FIG. 15.175), which, with the use of cams and guides not specified in further detail, traverses according to a circular pattern in a certain stroke, its pivoting point being the central point of rotation 176 of the peeling disc (FIG. 15a). During this periodic, synchro-adjusted movement of the collecting and pushing mechanism (FIG. 15a.103), taking place during each periodic displacement of the peeling disc, the tilting block 104 in FIG. 15a, wo which the collecting cap 105 is fastened, in each instance again assumes its position behind a newly arrived peeling clamp which has been rotated into position. To this end, the tilting block is lifted during the return movement of the collecting and pushing mechanism so as to be conveyed across the peeling clamp, use being made of a lifting device, partial top view of which is shown in FIG. 15.107a-108. The collecting and pushing mechanism guides the shrimp introduced until it is fully clamped between the peeling clamps, whereupon the collecting and pushing mechanism (FIG. 15b) returns and stretches the tail of the shrimp with the stretching elements 110 and 111 (FIG. 15c). These stretching elements are two small, conical arms, provided on a tiltable part 106 (FIG. 15b). The pivot motion is again performed about the shaft 109 (see FIGS. 15 and 15b). Before and during this tail-stretching operation (FIGS. 15b and 15c), the shrimp is furthermore held by a small pin 97 (FIGS. 14c.97 and 15c) which is spring-connected to the peeling clamp (FIG. 14.97) and, use being made of the guide tracks (FIGS. 14g.101a and 15c.101a), inserted into the shrimp. The shrimp continues rotating along with the peeling clamp, and in the following dwell period of the peeling disc the collecting and pushing mechanism is again brought into position, by various driving means not shown, ready to receive a new shrimp, etc. This process is repeated each second. FIG. 16 shows how the shrimp is positioned for completely and entirely symmetrically incising the peritoneum of the shrimp and the tail to the extreme tip. This is achieved by arranging a tial-straightening mechanism 113 just in front of the rotating cutting element 114. FIG. 16c.113 indicates the form of the straightening element; this is a small plastic block arranged tiltably and fixed by means of a spindle in the holdr 112. With the aid of a tensioning spring fitted about the spindle, not shown, the block 113 is automatically pressed down as shown in FIG. 16a.113. As a result, the tail of the shrimp follows the groove provided in the block 113. FIG. 16b indicates how the tail of the shrimp is maintained straight on the circumferential groove of the peeling disc. In order to incise the shrimp during its passage, a rotating cutting element (FIG. 17.114) is provided. FIG. 17c shows how this cutting element is composed, and mounted on a rapidly turning shaft (FIG. 17.117). The rotating cutting element consists of a cutting part shown in FIG. 17a, being two semicircular segments 115 with interrupted edge (FIG. 17b.116), clamped in a specially designed holder (FIG. 17d), comprising a part 118 which is fixed on the shaft 117, and a loose tightening washer 120 which is held down by a spring 120a. Two catch pins (FIG. 17d.119) cause the knife segments to be carried along. The pins 119, upon the tightening washer being closed, fall into recesses provided therein. FIG. 17c indicates how the knife segments 114, having been mounted, remain accurately centered by the pressure of the spring 120a, so that the shrimp is incised with a 100-percent symmetry. When the incised shrimp leaves the cutting element during the displacement of the peeling disc (FIG. 17), it passes by its tail portion (FIG. 18a.124) a rapidly rotating vibrating element 122, which serves for loosening the tail of the shrimp from the third segment. This element consists of a plastic hub (FIG. 18.122) fixed on the shaft, with a clamped-in rubber flap 121 comprising a thin steel wire 123 exactly in the lower part of a U-shaped recess; see FIG. 18.123. During fast rotation against the direction of motion of the oncoming tail, the tail portion (FIG. 18a.124) is loosened. This facilitates the complete removal of the horny shell of the tail of shrimps that are difficult to peel. FIG. 19 shows a tail-pulling mechanism as provided in the machine; see FIG. 1.19. At the same time that the peeling disc with the clamped shrimp stops after having been displaced, the already loosened tail portion is taken up by way of a groove (FIG. 19c.126) by a slowly rotating element (FIG. 19.125), the surface of which has been roughened (FIG. 19c.125). During this process, the tail portion will always be stretched lengthwise on the element 125, which applies to properly curved as well as to inadequately curved shrimps. The shrimp involved does not change its position during the receiving and stretching operation (FIGS. 19 and 19a). The direction of motion of the element is reckoned to be away from the tail. In order to have the process take place efficiently, the speed at which the element 125 passes the shrimp is reduced by providing three identical elements at the periphery of a hub 177 which is fastened on a shaft 178; see FIG. 19. Per periodic standstill of the peeling disc, only one element passes in each instance upon one third revolution of the shaft (FIG. 19.178). For engaging and clamping the shorny tail shell (FIG. 19a.127), a roller is provided (FIG. 19c.128), which upon a downward motion by means of an arm 131 is rolled freely along the first tail portion. The movement of this small roller is produced by a vertically reciprocating arm (FIG. 19.131) which is fixed to a pivot-jointed shaft 179, which is adjusted synchronously and periodically, and driven by such driving means as cam guides and cams. FIG. 19c indicates how the roller 128 is attached to the arm, the roller being spring-connected to the arm 131a by means of a resilient part 130, the tension of which is so selected that the roller 128 in FIG. 19a keeps the tail clamped onto the element (FIG. 19a). When the arm (FIG. 19b.131) has reached its upper position, the removed tail shell 127 lies upon the element for being discharged. In order to remove any impurities from the roller, a water-squirting device (FIG. 19b.134a) is provided which washes the roller 128 before being returned to the tail of the next shrimp. A brush element (FIG. 19b.133) removes the tail completely from the element involved by rotating against the direction of motion of that element (FIG. 19b). As soon as the horny tail shell is removed from the tail meat portion as shown in FIG. 19a, the peeling disc with the now tail-less shrimp is displaced. To provide for the sporadic cases where a tail ring should subsist around the tail meat, a ring-stripping element is arranged in the installation (FIG. 1, item 20), the movement of which is transmitted by a pivot shaft (FIG. 20.180) and produced by cams and the like. The operation of the lower part (FIG. 20.136) is shown in FIGS. 20a and 20b, the stripping part being constituted by a small stainless steel fork 138 which is attached to the arm 137 in FIG. 20. The stripping motion is performed as soon as the back side of the peeling clamp has neared the fork 138, whereupon the fork follows the tail portion while the shrimp is passing. As soon as the tail meat has passed, the stripping element moves away from the disc in order again to allow a newly arrived shrimp to pass, upon which it repeats its activity. Such ringlet as may have remained behind is removed by means of a brush (FIG. 21.145) which is passing; this is not shown in the drawing, but is produced automatically by the operation of the synchro-adjusted meat-shelling mechanism (FIGS. 22.144 and 21). During and after the removal of the tail ringlet, if any, the peeling clamp is directed downward along the guide track 101 in FIGS. 20 and 21, at which time the operation of opening the horny shell of the shrimp in a balanced manner is likewise produced, as shown in FIG. 21a, the shrimp meat already having been exposed. During the downward movement of the peeling clamp, which is composed of resilient material, the rollers 98 which are attached to the peeling clamps (FIGS. 21a and 21b) follow the profile (section) which is provided in the peeling disc. Since the peeling clamp elements consist of resilient material, the hooking upper edges, see FIGS. 21a and 21b, pantographically reproduce the pattern of the profile 91 of the peeling disc. The curvature of the shrimp meat is thereby exposed (FIG. 21a), and the horny shell is retained. This situation is also shown in the view of FIG. 21c, which furthermore indicates the meat-removing mechanism in operation. In order to remove the shrimp meat without at the same time also removing the digestion organisms from the likewise opened head of the shrimp, a screening sheet (FIG. 21c.146) has been arranged. A sectional view of this is presented in FIGS. 21a and 21b.146. The screening sheet 146 is arranged over the head of the shrimp by means of a special cam and a movable shaft 181 in FIG. 21 as soon as the clamped and opened shrimp has arrived in its periodic position of dwell (FIG. 21c). It is at that moment that the meat-shelling mechanism becomes operational. This mechanism consists of a hub element (FIG. 22.144) which is fixed and driven on the shaft, and which rotatably bears three satellite brushes (FIG. 21c.145) upon a satellite shaft 147 (FIG. 22a), as shown diagrammatically. A stationary sun wheel (FIG. 22.148) forces the rotation of the satellite shafts 147, because the small grears 183 which are fixed on the satellite axle (see FIGS. 22a and 22) are forced to unwind about the stationary gear wheel 148. The purpose thus attained is that the already exposed shrimp meat 141 (FIG. 21c) is rolled out by the brushes (FIGS. 22 and 23). FIG. 21b shows the shrimp meat 141 being caught by the screening sheet 146. A frontal view of this is indicated in FIG. 23. As soon as the shrimp meat has been rolled out, the peeling disc is again displaced, removing the empty shrimp shell, as shown in FIG. 24. To this end, the peeling clamp is pressed open by the guide track, or in this case by the cam 102, by the aforementioned means such as guide rollers, which are fastened by means of an axle to the peeling clamp. The empty shrimp shell (FIG. 24.151) is then removed by the rotating brush (FIG. 24.152), whereupon the peeling clamp is again readied for receiving a shrimp to be newly introduced, so that the overall peeling process can take place in a succession of mechanical operations in the installation described, one shrimp being supplied per second per peeling clamp, with the other operations taking place during the same unit of time or a fraction thereof.

In the embodiment of the overall installation, all moving parts and shafts are synchronously adjusted to each other by means of chain wheels and cams that are fixed on the shafts, use being made of chain and cam guides, so as to make the embodiment functionally operational for individually separating, straightening and transferring shrimps.

For the coupled peeling area, where the shrimps are introduced one by one in an equally directed manner, all moving parts and shafts are made functionally operational by means of gears and cams that are fixed on the shafts, use being made of cam guides, curved tracks, rollers, etc., the motion of each periodic function being synchro-adjusted to the other functional parts, so as to achieve the peeling process in the installation described and to implement it in the order as shown in FIG. 1, as specified in the claim for the method of the overall system.

MACHINE ACCORDING TO THE METHOD DESCRIBED, AND INSTALLATION FOR PEELING SHRIMPS ONE BY ONE

A machine for successively and individually isolating, straightening, transferring and shelling shrimps of different kinds, according to an entirely novel aytomated mechanical process and installation for the implementation thereof, as represented in the preceding drawings and descriptions of the methods and installations constituting the subject of the present patent application, toward which end the devices specified for the embodiment of the overall shrimp-peeling machine are accommodated in a construction (FIG. 1) and so designed and constructed that the processing tracks of the installation for the successive synchronized isolation, straightening and transferring of the shrimps correspond in number as well as in track width of the adjacent processing tracks to those of the coupled peeling unit for the successive and individual peeling of the shrimps supplied to the machine, use being made for the embodiment of the fully automated shrimp-peeling machine of a stainless steel frame construction (FIG. 1.31), the construction of the various processing elements to be accommodated being produced by means of plastic mounting plates that are arranged on both sides of the aforementioned frame. This also houses the bearings and supports for the shafts of the installation for isolating the shrimps one by one, the driving mechanism, consisting of chain and chain wheels, as well as the ball bearings that can be lubricated being protected from water and splashing as well as isolated from the area where the shrimps are processed, thus allowing the processing area to be thoroughly cleaned after the machine has been used. The peeling area, the peeling unit where the peeling process takes place, is so designed as to be removable, and is driven synchronously from a central gear box by a special coupling which fits together in one specific manner. The possibility thus attained of removing the peeling unit allows thorough cleaning of that area in such a way that, when the peeling unit is reassembled, there can be no question of derangement of the synchronized unit with respect to the installation accommodated in the frame for supplying the shrimps one by one. The rotating shafts and the shafts which undergo or produce an angular displacement are provided parallel to each other throughout the entire machine, allowing the embodiment of the peeling machine to be designed breathways so as to comprise a plurality of processing units or peeling tracks that are arranged side by side, without any need to deviate from the method and installation as described. For the implementation of the operations indicated in and for the method and installation, the processing elements are disposed in the machine in the order indicated as shown in FIG. 1. When the machine is in operation, the tails of the shelled shrimps are collected in receptacle 28 (FIG. 1), the peeled shrimps in receptacle 29 (FIG. 1), and the shells in receptacle 30 (FIG. 1), so that all shrimp components are collected separately. The peeling machine can also be embodied for different thickness sizes of shrimps, each machine being supplied with the properly selected and sorted size, this being capable of being implemented in such a way as to make it unnecessary to vary from the principles stated. The shrimps can then be submitted in the refrigerated state to the operations according to the method and process described, without any alterations having to be made in the machine.

We claim:

1. Shrimp-peeling machine, comprising a supply unit for boiled shrimps from which impurities have already been removed, a receptacle unit for receiving shrimps, means for picking up, further conveying and transferring in a correct position and in a correct sequence the shrimps (FIGS. 3–12), a peeling unit comprising a peeling disc (13), provided with means (14) for individually clamping and further conveying with the peeling disc the separate shrimps, cutting means (17), cooperating with the peeling disc for slitting the shrimps, tail-pulling elements (19) and means for removing the shrimp meat from the shell of each shrimp (22) and means for separately removing and collecting the shell and the meat (28–30), characterized in that the receptacle unit (FIG. 2) is adapted for keeping a small quantity of shrimps in a vibratory motion and at some distance above the bottom of the receptacle unit is mounted a suction mouth being mounted (36) for picking up a separate shrimp and, after displacement of the suction mouth, repelling a picked-up shrimp by means of compressed air into a time-divider (FIG. 4) for periodically transferring a shrimp in the pick-up and conveying means.

2. Shrimp-peeling machine according to claim 1, characterized in that the receptacle unit (FIG. 2) is provided with a flexible bottom (37) which can be brought in vibration by means of an eccentric mechanism (39) and that further time-divider (FIG. 4) is mounted, which comprises a semicylindrical housing (47) and a rotatable blade (49) fixed to a centrally located shaft (163).

3. Shrimp-peeling machine according to claim 1, characterized in that the means for picking up, further conveying and transferring in a correct position and in a correct sequence the shrimps, is provided with a downwardly arranged chute (FIG. 5) with a vibrating bottom (52) and comprising a retainer element (54), a separating chute (57) linked up to the downwardly arranged conveyor chute (5) which can cooperate with separating means (64, 68) for further conveying one shrimp at a time and further linked up to a conveyor (70) and a connected, downwardly arranged turning chute (74) and a directing chute (75–77).

4. Shrimp-peeling machine according to claim 1, characterized by a vibratory chute (FIG. 5) comprising a wire fabric bottom (52), the longitudinal and the transverse form of which constitutes a curved pattern (FIG. 5d), the upper part of the chute being virtually flat and the outlet having a wide curvature (FIG. 5d), the outlet being tapered and the vibratory chute being positioned under the time-divider and comprising vibrating means (39a) for vibrating the chute in such a way that a supplied shrimp is orientated which its rounded part into the direction of transfer.

5. Shrimp-peeling machine according to claim 1, characterized by a conveyor (FIG. 7a.70) with a belt (70) of elastic material, in which on the delivery side of the conveyor the driving pulley (71) around which the belt is tensioned, has a hollow diabolic surface (FIG. 8), and further comprising a turning chute (74), a collecting chute (75) connected with a directing chute (77) and a longitudinal reciprocable conveyor chute (84) in which the turning chute (74) has a longitudinal curvature (FIG. 9a) and a transverse curvature which at the upper end has a larger radius and which forms at the bottom outlet a semi-circle (FIG. 9a) and in which the end portion of the turning chute (74) is formed as a straight cylinder (FIG. 9) the collecting and directing chute (75) being composed of two parts, the collecting chute being provided with a cut-out tapering slit (76) passing into a parallel slit (78) and, that underneath this slit a U-shaped directing chute (77) is arranged which has almost no size or extent at the beginning and passes linearly into a full U-shape (FIG. 10), the collecting and directing chute (75–77) being provided with a water socket (80) just below the upper part of the curvature of the collecting chute (74) where the slit begins (FIG. 10).

6. Shrimp-peeling machine according to claim 1, characterized in that the conveyor and transferring means are adapted in such a way, that each shrimp will come to rest with the head and a part of the back against the peeling disc and the rounded part of the shrimp is directed against the direction of movement of the peeling disc, the clamping means (14) being provided with clamps (96) with hook-formed ends on opposite sides of the peeling disc and being able to carry out a radial movement with regard to the peeling disc for clamping the upwards directed edge parts of the shrimp shell and for leaving those parts loose, the cutting means being adapted to cut the shrimps at the ventral side between the clamps (96) nearly over the full length until the utter point of the tail, further comprising a tail pulling mechanism situated in the direction of rotation past the cutting means and further comprising a brush for brushing the shrimp meat out of the opened shell of the shrimp.

7. Shrimp-peeling machine according to claim 1, characterized in that between the conveying and transferring means and the peeling disc there is mounted a collecting and pushing mechanism (FIG. 15), comprising a small tilting block (104) which can be withdrawn from the peeling disc when the disc is stepwise rotated for letting pass a pair of clamps, the small tilting block (104) comprising an opening for accommodating the rounded part of a shrimp, and being able to cooperate with a reciprocable movable chute (FIG. 11b.84) and to cooperate in synchronous way with a regulating valve (87), further comprising at least two stretching elements (110, 111) for engaging the tail of a shrimp for stretching this tail when the peeling disc is rotated.

8. Shrimp-peeling machine according to claim 1, characterized in that it is provided with a separating chute (57) cooperating with a separating mechanism (FIG. 7) in which the separating chute (57) is arranged downwardly in conveying direction of the shrimps, the separating chute being aligned with a vibrating chute (FIG. 5a), and in which the separating mechanism comprises at least one suction mouth (64) and at least one blowing nozzle (68) for picking up one shrimp from the separating chute (57) and depositing it on a connected conveyor (70) and in which the blowing nozzle (68) is arranged in such a way that if necessary a second shrimp or an incorrectly positioned shrimp will be blown from the separating chute (FIG. 7c).

9. Shrimp-peeling machine according to claim 1, characterized by means to orientate, collect and clamp shrimps (FIG. 13a.103), in which the peeling unit comprises clamping means which are radially movable mounted on the peeling disc (FIG. 13a.88) in which the peeling disc is provided with lateral profiled contours for directing the clamping means (FIGS. 14a and 14d) and in which these clamping means (FIG. 14) consist of stainless steel spring leaf material, the top edge of which has a hooking shape (FIG. 14.96), this hooking upper edge passing into a slopingly compressed inlet side (FIG. 14.95a) and comprising a bent profile in the sides of the clamp with the hooking upper edge facing in an inclined manner toward the inside (FIG. 14.96d) and in that guiding means are provided to cooperate with the laterally profiled contour of the disc (FIG. 14.98) and further comprising guiding means (101–102) for moving upwards and downwards the shrimp clamps when the peeling disc is stepwise rotated.

10. Shrimp-peeling machine according to claim 1, characterized by a tail-directing mechanism just before the cutting means in the direction of rotating of the peeling disc (FIG. 1.16), further comprising a tiltable small block (113) connected to a holder, this block comprising a groove-shaped recess through which the tail of the shrimp can slide (FIGS. 16a, b, c), the small block (113) being pressed downwardly toward the peeling disc (85).

11. Shrimp-peeling machine according to claim 1, characterized in that the cutting means are comprising a fast rotatable cutting knife consisting of at least two radially divided cutting knife segments which are mounted on a rotatable shaft (117), comprising further at least one compression spring (120), at least one compression ring (120, 120b, 118b) and at least one driving pin for each cutting knife segment for rotatable driving of each cutting knife segment (114) together with the shaft (117).

12. Shrimp-cutting machine according to claim 1, characterized in that around the circumference of the cutting disc seen in rotational direction past the cutting means there is mounted a tail pulling mechanism (19) comprising a flexible flap (121) with a stainless steel wire (123) which are pressed in a vibrational way against the tail of a shrimp and in which for the removal of a loosened tail, a tail pulling element is present comprising a rotatable hub (177, 178) with at least one gripping segment (125) and a roller (128) resiliently pressed against the gripping segment (125) and cooperating with this segment for clamping a loosened tail between the roller (128) and the gripping segment (125) and for removing this tail.

13. Shrimp-peeling machine according to claim 1, characterized by a ring stripping element (FIGS. 20a and 20b) cooperating with the peeling disc, and further comprising a forked ring stripper (136) which is reciprocably movable for gripping a left behind ring of the tail shell of a shrimp (139) and which can be moved away from the peeling disc for letting pass a following shrimp, clamped in a peeling clamp.

14. Shrimp-peeling machine according to claim 1, characterized in that the means for removing the shrimp meat from the shell are provided with a synchronously rotable driving shaft (182) with a direction of rotation contrary to that of the peeling disc, and that the means are provided with centrically and peripherally arranged satellite pins (147) controlled by geared transmission means (183) and a centrally positioned sun wheel (148), the satellite pins (147) being provided with brushes (145) which brushes are provided with recesses (145d), a bent screening sheet (146) being provided between the brushes and the peeling disc.

* * * * *